(12) United States Patent
Shnell et al.

(10) Patent No.: US 12,128,620 B2
(45) Date of Patent: Oct. 29, 2024

(54) PORTABLE, RUGGEDIZED AND EASY TO USE 3D PRINTING SYSTEM

(71) Applicant: CRAITOR, INC., San Diego, CA (US)

(72) Inventors: Eric Shnell, Vista, CA (US); Akhil Birlangi, San Diego, CA (US); Nathan Chiu, San Gabriel, CA (US); Niklas Sprute, San Diego, CA (US)

(73) Assignee: CRAITOR, INC., San Diego, CA (US)

( * ) Notice: Subject to any disclaimer, the term of this patent is extended or adjusted under 35 U.S.C. 154(b) by 0 days.

(21) Appl. No.: 18/036,978

(22) PCT Filed: Nov. 16, 2021

(86) PCT No.: PCT/US2021/059523
§ 371 (c)(1),
(2) Date: May 15, 2023

(87) PCT Pub. No.: WO2022/104264
PCT Pub. Date: May 19, 2022

(65) Prior Publication Data
US 2023/0321908 A1 Oct. 12, 2023

Related U.S. Application Data

(60) Provisional application No. 63/225,813, filed on Jul. 26, 2021, provisional application No. 63/114,027, filed on Nov. 16, 2020.

(51) Int. Cl.
*B29C 64/393* (2017.01)
*B29C 64/245* (2017.01)
(Continued)

(52) U.S. Cl.
CPC ............ *B29C 64/25* (2017.08); *B29C 64/245* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/393; B29C 64/245; B29C 64/25; B33Y 10/00; B33Y 30/00; B33Y 50/02; B28B 1/001; A61C 13/0019
See application file for complete search history.

(56) References Cited

U.S. PATENT DOCUMENTS

| 6,722,872 B1 | 4/2004 | Swanson |
| 7,033,160 B2 | 4/2006 | Fong |

(Continued)

FOREIGN PATENT DOCUMENTS

| CN | 205219757 U | 5/2016 |
| CN | 104210105 B | 1/2017 |

(Continued)

OTHER PUBLICATIONS

NScrypt. "NRugged." Accessed Jul. 5, 2023. https://www.nscrypt.com/nrugged/.

(Continued)

*Primary Examiner* — Jamel M Nelson
(74) *Attorney, Agent, or Firm* — Jordan IP Law, LLC

(57) ABSTRACT

A portable and ruggedized 3D printing system that is suitable for deployment in extreme environments for combat situations or disaster relief or in remote locations. The 3D printing system includes an enclosure that is openable, water resistant, and made of materials that are impact resistant. A 3D printer within the enclosure includes active and passive suspension systems that provide shock absorption. The 3D printing system further includes one or more internal and/or external sensors that monitor, in real time, various aspects of the printer, its environment, and/or the object being printed. Data from the one or more sensors is used to adjust internal print operating parameters via sensor fusion machine learning algorithms on an onboard processor.

16 Claims, 31 Drawing Sheets

(51) Int. Cl.
*B29C 64/25* (2017.01)
*B33Y 10/00* (2015.01)
*B33Y 30/00* (2015.01)
*B33Y 50/02* (2015.01)

(56) References Cited

U.S. PATENT DOCUMENTS

| | | | |
|---|---|---|---|
| 7,209,797 | B2 | 4/2007 | Kritchman |
| 7,305,367 | B1 | 12/2007 | Hollis |
| 7,427,374 | B2 | 9/2008 | Fong |
| 7,962,237 | B2 | 6/2011 | Kritchman |
| 8,317,508 | B2 | 11/2012 | Bokodi |
| 8,562,324 | B2 | 10/2013 | Pettis |
| D737,345 | S | 8/2015 | Anantha |
| 9,149,870 | B2 | 10/2015 | Minick |
| 9,626,142 | B2 | 4/2017 | Pettis |
| 9,672,550 | B2 | 6/2017 | Apsley |
| 9,802,355 | B2 | 10/2017 | Snyder |
| 9,833,986 | B1 | 12/2017 | Susnjara |
| 9,950,476 | B2 | 4/2018 | Nguyen |
| 10,016,940 | B2 | 7/2018 | Liu |
| 10,052,822 | B1 | 8/2018 | Sait |
| 10,063,529 | B2 | 8/2018 | Milazzo |
| 10,081,132 | B2 | 9/2018 | Dawson |
| 10,178,868 | B2 | 1/2019 | Contractor |
| 10,183,329 | B2 | 1/2019 | Gunther |
| 10,195,666 | B1 | 2/2019 | Barnet |
| 10,204,178 | B2 | 2/2019 | Wegner |
| 10,265,911 | B1 | 4/2019 | Capri |
| 10,300,651 | B2 | 5/2019 | Noorazar |
| 10,406,801 | B2 | 9/2019 | Bell |
| 10,421,267 | B2 | 9/2019 | Reese |
| 10,437,208 | B2 | 10/2019 | Avula |
| 10,442,118 | B2 | 10/2019 | Grewell |
| 10,457,036 | B2 | 10/2019 | Susnjara |
| 10,521,515 | B2 | 12/2019 | Voris |
| 10,705,509 | B2 | 7/2020 | Snyder |
| 10,751,934 | B2 | 8/2020 | Lakshman |
| 10,766,244 | B2 | 9/2020 | Susnjara |
| 10,786,944 | B1 | 9/2020 | Susnjara |
| 10,836,106 | B2 | 11/2020 | Gjovik |
| 10,885,214 | B2 | 1/2021 | Gosch |
| 10,926,456 | B2 | 2/2021 | Dawson |
| 10,933,586 | B2 | 3/2021 | Susnjara |
| 10,953,647 | B2 | 3/2021 | Hardee |
| 11,026,433 | B2 | 6/2021 | Contractor |
| 11,029,896 | B2 | 6/2021 | Wegner |
| 11,040,491 | B2 | 6/2021 | Lameris |
| 11,072,162 | B2 | 7/2021 | Susnjara |
| 11,084,276 | B2 | 8/2021 | Reese |
| 11,097,485 | B2 | 8/2021 | Boveington |
| 11,189,021 | B2 | 11/2021 | Shah |
| 11,254,058 | B2 | 2/2022 | Ward |
| 2006/0133798 | A1 | 6/2006 | Palmer |
| 2015/0122577 | A1* | 5/2015 | Zalewski .............. G10K 11/172 181/290 |
| 2015/0132425 | A1* | 5/2015 | Lacaze .................. B33Y 50/00 425/150 |
| 2016/0107392 | A1 | 4/2016 | Lubin |
| 2017/0036399 | A1 | 2/2017 | Cheung |
| 2017/0057170 | A1* | 3/2017 | Gupta ................ G05B 19/4099 |
| 2017/0255171 | A1* | 9/2017 | Avula ..................... G05B 15/02 |
| 2017/0355139 | A1 | 12/2017 | Wolf |
| 2018/0101167 | A1 | 4/2018 | Dehghanniri |
| 2018/0126671 | A1 | 5/2018 | Wilenski |
| 2018/0326665 | A1 | 11/2018 | Gatenholm |
| 2019/0037012 | A1 | 1/2019 | Stocker |
| 2019/0084240 | A1 | 3/2019 | Ward, Jr. |
| 2019/0123711 | A1* | 4/2019 | Revier ............... H03H 9/02653 |
| 2019/0178755 | A1 | 6/2019 | Lee |
| 2019/0202132 | A1 | 7/2019 | De Pena |
| 2019/0227897 | A1* | 7/2019 | Sinclair .............. G06F 11/3006 |
| 2019/0263053 | A1 | 8/2019 | Tsang |
| 2019/0263064 | A1 | 8/2019 | Von Burg |
| 2019/0322048 | A1 | 10/2019 | Huitema |
| 2020/0055255 | A1 | 2/2020 | Ota |
| 2020/0086571 | A1 | 3/2020 | De La Torre Ugarte Del Castillo |
| 2020/0142384 | A1 | 5/2020 | Bressler |
| 2020/0160497 | A1 | 5/2020 | Shah |
| 2020/0171750 | A1* | 6/2020 | Beckmann ............ B29C 64/386 |
| 2020/0171811 | A1 | 6/2020 | Bell |
| 2020/0198250 | A1 | 6/2020 | Shitrit |
| 2020/0218628 | A1 | 7/2020 | Mathews, Jr. |
| 2020/0230884 | A1 | 7/2020 | Buggenthin |
| 2020/0242496 | A1* | 7/2020 | Salasoo .................. B22F 10/20 |
| 2020/0254689 | A1* | 8/2020 | Gjovik .................. B29C 64/209 |
| 2020/0326683 | A1 | 10/2020 | Oligschlaeger |
| 2020/0353688 | A1 | 11/2020 | Boveington |
| 2020/0398488 | A1* | 12/2020 | Davis ..................... B29C 64/245 |
| 2020/0406552 | A1 | 12/2020 | Catana Salazar |
| 2021/0016493 | A1 | 1/2021 | Bracha et al. |
| 2021/0046709 | A1 | 2/2021 | Barbolini |
| 2021/0072725 | A1* | 3/2021 | Rakshit .............. G05B 19/4099 |
| 2021/0101339 | A1* | 4/2021 | Boring ................... B29C 64/25 |
| 2021/0154915 | A1 | 5/2021 | Susnjara |
| 2021/0162664 | A1 | 6/2021 | Raynes |
| 2021/0178685 | A1 | 6/2021 | Susnjara |
| 2021/0206097 | A1 | 7/2021 | Schalk |
| 2021/0206104 | A1 | 7/2021 | Laws |
| 2021/0221058 | A1 | 7/2021 | Cano |

FOREIGN PATENT DOCUMENTS

| | | |
|---|---|---|
| CN | 108908939 | 11/2018 |
| CN | 210851339 U | 6/2020 |

OTHER PUBLICATIONS

Romeo, Jim. "How 3D Printing Helps the U.S. Military." GrabCAD Blog, Aug. 14, 2019. https://blog.grabcad.com/blog/2019/08/14/3d-printing-and-the-military/.

Shnell, Eric. "Craitor," May 18, 2019. https://devpost.com/software/craitor.

* cited by examiner

PORTABLE, RUGGEDIZED AND EASY TO USE 3D PRINTING SYSTEM

CROSS-REFERENCE TO RELATED APPLICATIONS

This application represents the U.S. National Phase of International Application number PCT/US2021/059523, entitled "Portable, Ruggedized and Easy to Use 3D Printing System", filed on Nov. 16, 2021, which claims priority to U.S. Provisional Patent Application No. 63/114,027 filed Nov. 16, 2020, entitled "Portable and Ruggedized 3D Printing System" and to U.S. Provisional Patent Application No. 63/225,813 filed Jul. 26, 2021, entitled "Portable, Ruggedized and Easy to Use 3D Printing System", all of which are incorporated herein by reference in their entirety.

BACKGROUND OF THE INVENTION

An analysis of recent military logistics efficiency shows a severe need for a more efficient supply chain. Mission critical parts can take upwards of multiple years to be delivered through the current supply chain. Scavenging occurs as a result. Further to this, supply-chain convoys are prime targets for improvised explosive devices (IEDs) and ambushes. In Afghanistan, from 2005-2009, there was a direct correlation between the number of lives lost to IEDs and the amount of fuel spent transporting equipment. The United States Department of Defense (DoD) aims to rectify these issues and react faster to part failures by exploring field-deployable manufacturing solutions.

Rapid prototyping and/or 3D printing technology has progressed significantly in the last decade. 3D printing refers to a set of processes (which can vary extensively) for the extrusion of materials into a three-dimensional space in order to create a three-dimensional physical object. 3D printing is also known as additive manufacturing. 3D printers today can utilize plastic materials and/or composite materials, such as nylon or carbon fiber, and even metals. These materials offer great integrity and strength in printed components. As such, modern 3D printing technology has been used for printing industrial-use parts.

Deployable on-site manufacturing using 3D printing is an effective approach for targeting supply chain inefficiency. Manufacturing on site allows the supply chain to subvert logistical slowdowns and ensure fast response to part failures. However, current 3D printers are large, bulky and relatively fragile and 3D printing processes such as fused deposition modeling (FDM) are sensitive tasks. Catastrophic failures in part quality can result if a 3D printing process is disturbed. As such, use in extreme environments currently poses a challenge for 3D printers. Therefore, a portable, rugged and easy-to-use 3D printing system would be beneficial, for both military and other applications.

SUMMARY OF THE INVENTION

In accordance with the present invention, a 3D printing system is provided wherein the 3D printing system is portable and ruggedized, thereby even being suitable for deployment in extreme environments for combat situations, disaster relief, scientific research, oil/gas/mineral exploration and production or in other remote locations at the point of need. The 3D printing system of the invention is capable of withstanding the climate and exterior conditions found, for example, at forward operating (military) bases.

The 3D printing system includes a hermetically sealed enclosure or case defining a sealed chamber. The enclosure is openable, water resistant, and made of materials that are impact resistant. Preferably, the enclosure is made of plastic materials. The enclosure is mechanically ruggedized with exterior bumpers and interior bumpers, withstands extreme climates and provides water and dust protection. Preferably, the exterior bumpers are made of a rubber or plastic material. In one embodiment, the enclosure is openable at a top portion thereof. In another embodiment, the enclosure is openable at a side portion thereof.

The 3D printing system further includes, in some versions, an internal, thermally insulated chamber that is heated to maintain a stable operating print chamber temperature in various print environments.

The 3D printing system further includes a 3D printer. The 3D printer resides within the sealed chamber defined by the enclosure and includes active and passive suspension systems that provide shock absorption, serve to ruggedize the externals and internals of the 3D printer and allow for printing during movement. Preferably, the passive suspension system includes one or more tuned mass dampeners tuned to the most common mode of noise and vibrations the 3D printing system will experience. The active suspension system preferably includes actuated servos, inertial measurement units, and other motion sensors tasked with proactively responding to extraneous vibrations and disturbances that the passive suspension system is not tuned for. The suspension systems ensure that the printer is capable of surviving falls and handling minor and major disturbances during prints.

The 3D printing system further includes a modularized control system that is housed external to the 3D printing chamber. The modularized control system includes the printer control board and the machine learning processor. The control system is contained within a box that has independent environmental control and is heated with active (heating element within the electronics enclosure) and passive (leveraging heat generated within the print chamber to heat the electronics enclosure) systems. Environmental conditions within the electronics chamber are monitored and controlled through the above-described heating solutions, and cooling through airflow directed with fans. Humidity is monitored and controlled through temperature differentials generated through the heating system.

The 3D printer also includes one or more internal and/or external sensors that monitor, in real time, various aspects of the printer, its environment, and/or the object being printed. For example, the one or more sensors may gauge or monitor: motor diagnostics; input current; rotation speed; axis velocity/acceleration/jerk; climate conditions; temperature; barometric pressure; humidity; shock waves; explosions; print diagnostics; filament parameters; print quality (e.g., by visual imaging); location (i.e., GPS data The printer will integrate a shock wave detector (or other explosion detector) that, working with the IMUs, detect shockwaves or related disturbances above a certain threshold and could immediately stall the printing process for either a set period of time or a time dependent on the external pressure and mechanical disturbances falling below a lower threshold. The shock wave detection (or other explosion detection) allows the system to not only pause the print but optionally move the print head to a locking fixture prior to the air blast wave and ground movement. Preferably, the one or more sensors include a 3D imaging device that can actively monitor the progress and quality of the 3D object being printed and can be used for part scanning purposes, to verify specifications (e.g., measurement tolerances) and to test for inclusions and defects in the printed object. If a flaw is detected that exceeds acceptable thresholds the system can be set to alert the user(s) in-situ and/or stop printing in order to save time and material. This is especially important because a 3D printer operating in extreme conditions is more susceptible to errors caused by the environment i.e., changes in weather or shocks caused by combat environments or vibrations that vary while moving or during drilling or excavation activities. Computer vision combined with intelligent software provide substantially more precision than possible with the human eye. Furthermore, it would not be practical for a person to continually watch a print job throughout a multi-hour print job. Also, the 3D imaging device would be used for detecting part position within the chamber to calibrate extruder head position relative to the position of the part and current print layer either during the print process, or after restarting after a pause, abort, loss of power, or any other discontinuity in 3D print process.

In one preferred embodiment, the integration of an independent part-processing solution is used to edit the 3D printed parts during and after the print process. This editing tool may be integrated directly into the existing gantry, or have an independent movement system, and is capable of moving around the part to edit the 3D geometry of a part in progress or a finished part.

In one preferred embodiment, an onboard processor of the 3D printing system includes one or more sensor fusion machine learning algorithms. In accordance with the one or more sensor fusion machine learning algorithms, machine learning (ML) or other intelligent software is implemented to modify operating internal print parameters via an internal processor and sensor fusion (i.e., the combination of data collected from the internal and/or external sensors). An example of application would include the detection of movement within the motion systems that was not controlled/performed by the linear motion systems due to external shocks or vibrations. This would be detected by the IMUs described above and the sensor fusion algorithm would determine a solution (recalibration, aborting of print etc.) Preferably, the one or more algorithms are developed and updated in a network (e.g., a cloud network) of 3D printers, where the 3D printers operate as data collection nodes for a central ML algorithm. Preferably, the network hosts a repository of 3D part files from various providers and the 3D printing system includes a 3D scanner and software to scan and recognize portions of broken parts and match them to similar parts within the repository, providing the operator with potential matches to select from.

In a related embodiment, the 3D printer electronics system tracks the data collected by the sensors and all adjustments made during a print cycle and creates a report for the user. The report shows any potential issues and time-stamped "events" (e.g., a shock to the system or sudden changes in temperature or humidity). Preferably, the report includes a score reflecting how "successful" the print was (e.g., based on the number of adjustments needed, any detectable deviations from a render or theoretical model, etc.) This score is given to the user to help facilitate use decisions and is also saved to be used to optimize ML algorithms or other intelligent software.

In a related embodiment, the 3D printer is paired with a dedicated electronic device such as a tablet or smartphone, preferably a ruggedized tablet or smartphone that meets military specifications. This device would control the printer as well as download parts files and/or be used to create parts files.

In a related embodiment, an integrated payment and quality control system would facilitate the production of parts. Parts prices would be determined by estimated cost plus a premium and/or by market prices for comparable parts. Pricing the part is one step of the integrated payment and quality control system. The other step would be for a printer operator to verify the part file to be printed is the correct part file. When the part has been printed the score generated by the system will indicate if the print was a success. The printer operator can accept or reject that the print was a success. If accepted then payment is allowed.

Additional objects, features and advantages of the invention will become more readily apparent from the following detailed description of preferred embodiments of the invention when taken in conjunction with the drawings wherein like reference numerals refer to corresponding parts in the different views.

DETAILED DESCRIPTION OF THE INVENTION

Figure 1:
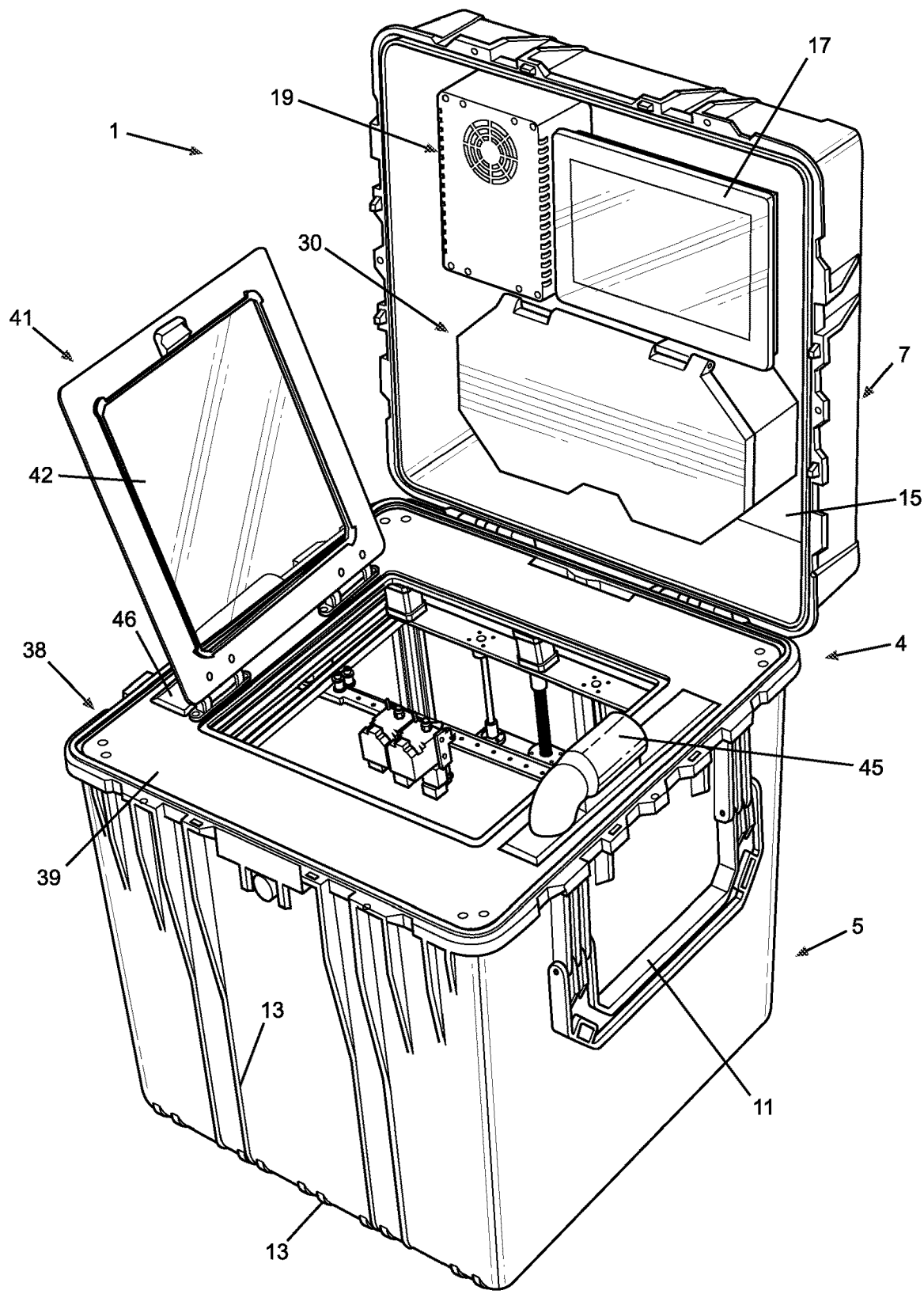
FIG. 1 is an upper perspective view of a top-opening embodiment of a 3D printing system in accordance with the present invention.

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show particular details. Therefore, specific structural and functional details disclosed herein are not to be interpreted as limiting, but merely as a representative basis for teaching one skilled in the art to employ the present invention.

As used in this specification and the appended claims, the singular forms "a", "an" and "the" include plural referents unless the content clearly dictates otherwise. As used in this specification and the appended claims, the term "or" is generally employed in its sense including "and/or" unless the content clearly dictates otherwise.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "front," "back," "top" and "bottom", as well as derivatives thereof (e.g., "horizontally," "downwardly," "upwardly," etc.), should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Figure 18:
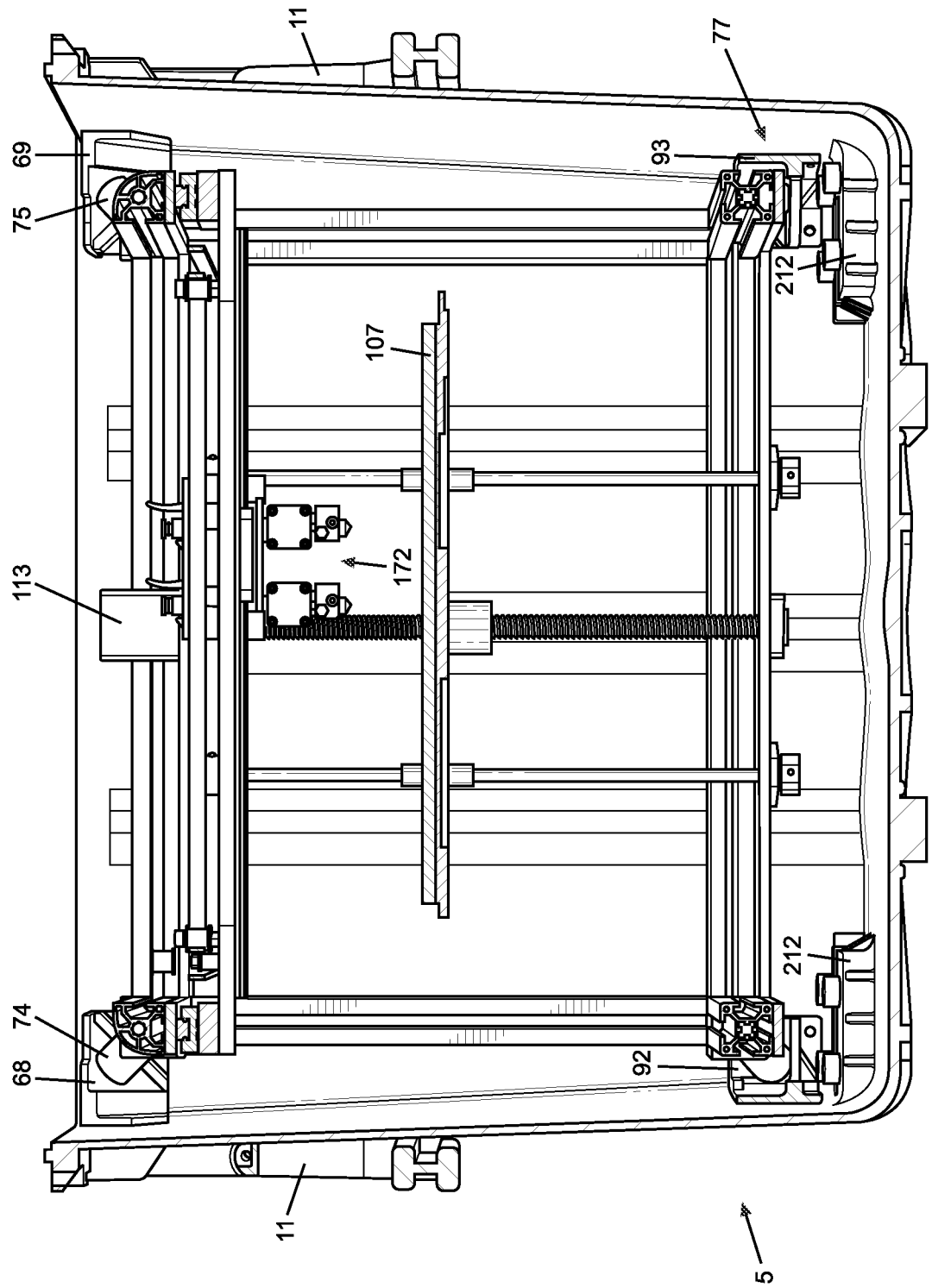
FIG. 18 is a cross-sectional view of the 3D printer of FIG. 2 housed within the body of the enclosure.

FIG. 1 shows a 3D printing system 1 in accordance with the present invention. 3D printing system 1 includes a hermetically sealed enclosure 4 defining a sealed chamber (not separately labeled). As shown, enclosure 4 has a body 5 that is attached to a lid 7 via hinges (not separately labeled). Enclosure 4 is water resistant and made of materials that are impact resistant. Preferably, the enclosure is made of plastic materials and can be sealed for waterproofing and dustproofing purposes. Handles 11 that are attached to the exterior of body 5 grant portability to the 3D printing system while exterior bumpers 13 on body 5 help ruggedize the 3D printing system (one handle 11 is shown in FIG. 1, another handle 11 is located opposite the handle as shown in FIG. 18). Preferably, the exterior bumpers are made of a rubber or plastic material.

Lid 7 includes a lid plate 15 on its underside to which various elements are mounted: a user interface 17, an electronics housing 19 and a filament case 30. As shown in FIG. 1, user interface 17 includes a touchscreen display monitor unit (not separately labeled). However, other user interfaces could be employed with the 3D printing system of the present invention. Preferably, the user interface is watertight and airtight. Electronics housing 19 is described in more detail below with the discussion of FIGS. 22 and 32. Filament case 30 is used to store 3D printing filament(s). One type of 3D printing process, called fused deposition modeling (FDM), relies on heating a ductile filament material to near its melting point and continuously depositing the heated material in layers to create a physical object. As the layers cool, the continuous filament fuses to provide structural integrity. FDM can be used to print plastic and composite materials (e.g., nylon or carbon fiber). However, the 3D printing system of the present invention is not limited to being used for FDM printing. Also, the filament case can be of other geometric shapes and sizes than shown in FIG. 1.

Figure 19:
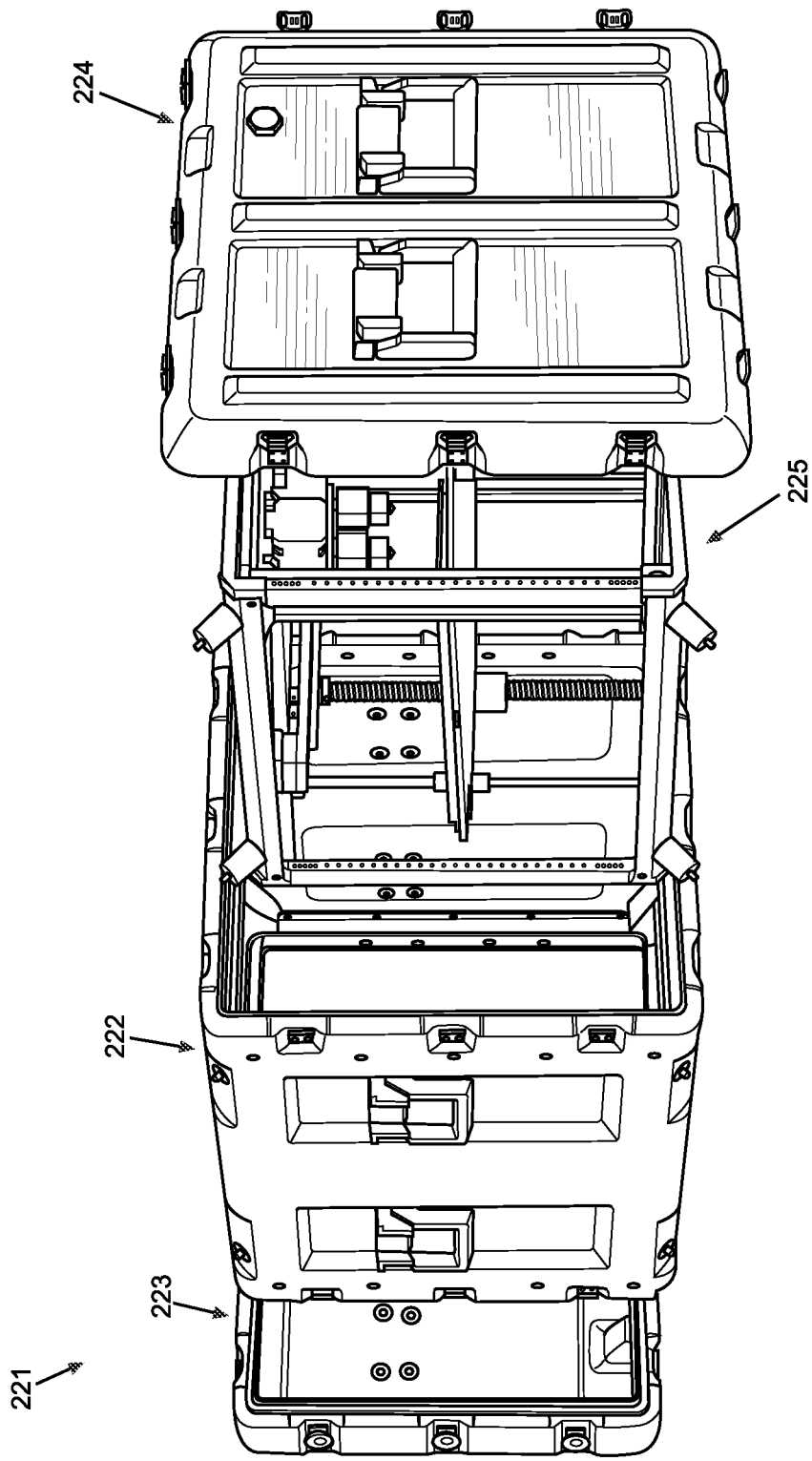
FIG. 19 is an exploded view of a side-opening embodiment of a 3D printing system in accordance with the present invention.

As shown in FIG. 1, enclosure 4 of 3D printing system 1 is openable at a top portion 38 of body 5 (FIG. 19 shows an alternative, side-opening embodiment as described below). In use, lid 17 is moved from top portion 38 to reveal a door plate 39 and a door 41. Door 41 is preferably attached to door plate 39 via hinges (not separately labeled) and preferably includes a transparent section 42 which allows the user to view beneath the door. Whether or not the door is transparent users could use a camera view beneath the door. Together, door plate 39 and door 41 cover a 3D printer as described in further detail in the discussion of FIGS. 2-16 below. Manifolds 45 and 46 reside upon and in door plate 39 and facilitate air movement (e.g., for fume management).

Figure 2:
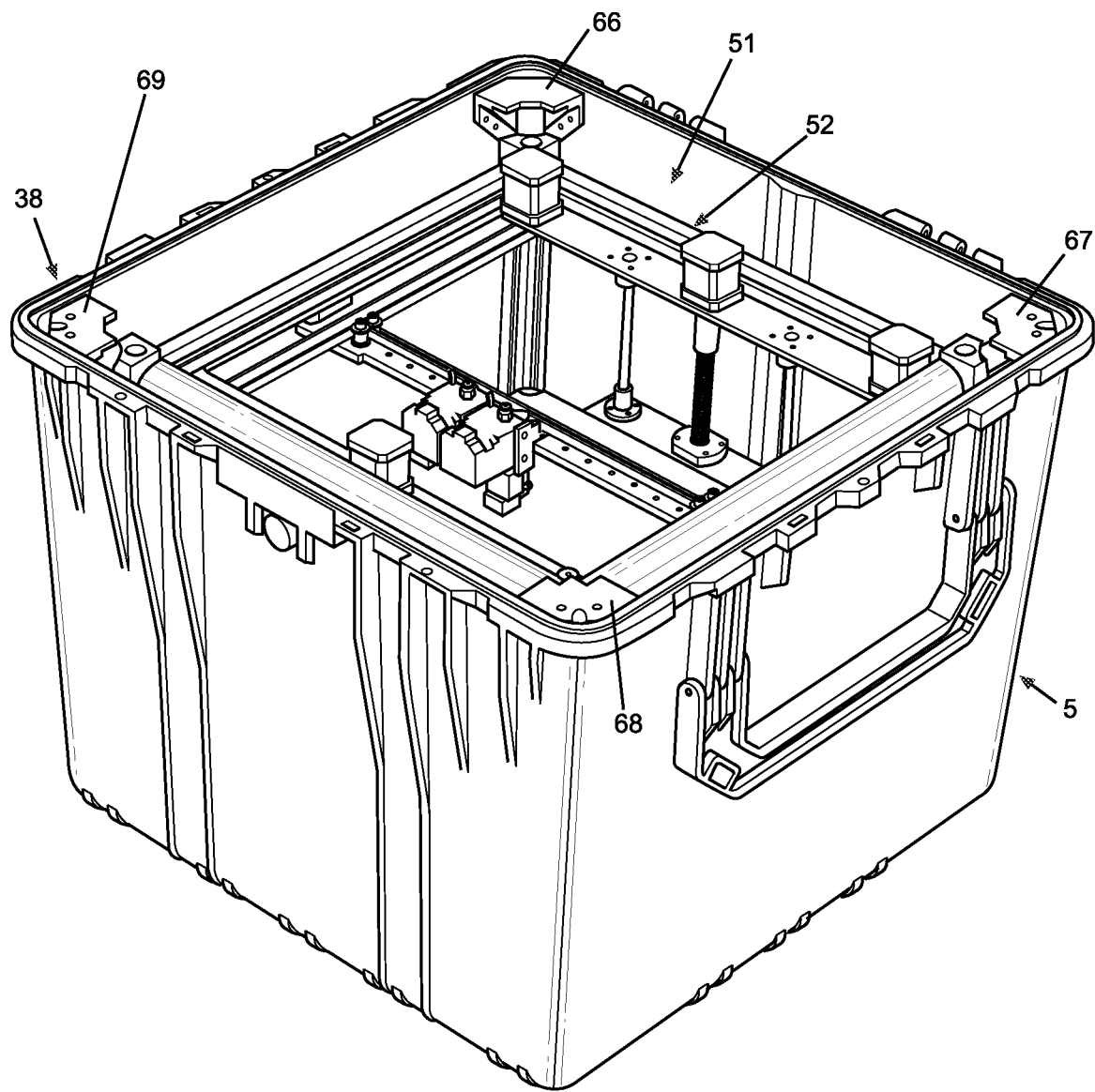
FIG. 2 is an upper perspective view of the 3D printing system of FIG. 1 in which the lid, door and door plate of the enclosure have been removed to show the 3D printer housed within the body of the enclosure.
Figure 3:
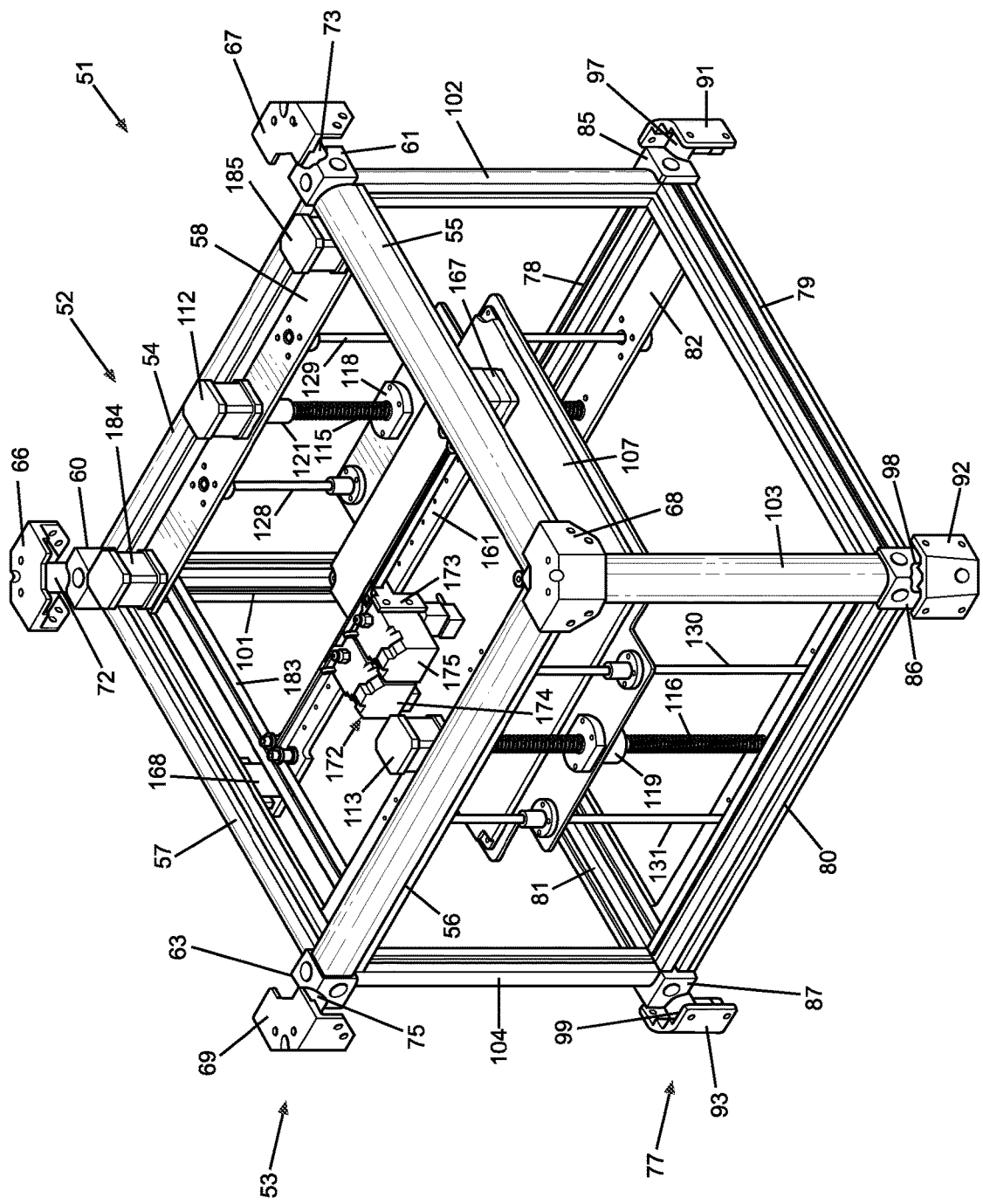
FIG. 3 is an upper perspective view of the 3D printer of FIGS. 1 and 2 which has been removed from the enclosure.
Figure 4:
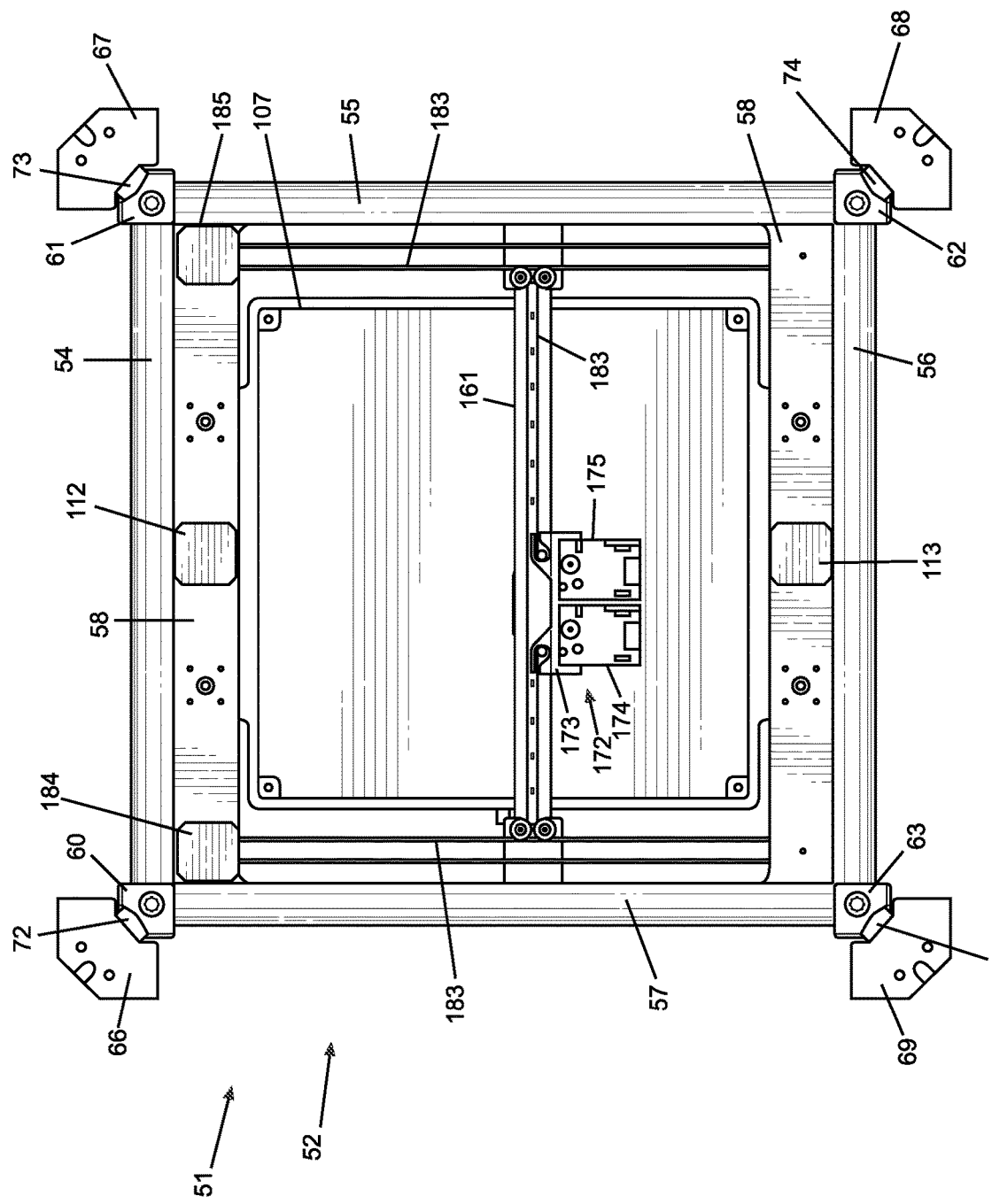
FIG. 4 is a top view of the 3D printer of FIG. 3.

In FIG. 2, lid 7, door 41 and door plate 39 are removed to show a 3D printer 51 having a chassis 52 and residing within body 5 of enclosure 4. FIGS. 3-8 show 3D printer 51 on its own (separate from body 5). As shown in FIG. 3, chassis 52 includes an upper assembly 53 having upper horizontal beams 54-57 upon an upper mounting plate 58. Upper horizontal beams 54-57 are joined at upper corner mass dampeners 60-63 (see upper corner mass dampener 62 in FIG. 4). Upper corner mass dampeners 60-63 are attached to upper corner brackets 66-69 via upper corner mounts 72-75, respectively. Chassis 52 further includes a lower assembly 77. The lower assembly includes lower horizontal beams 78-81 upon a lower mounting plate 82. Lower horizontal beams 78-81 are joined at lower corner mass dampeners 84-87 (see lower corner mass dampener 84 in FIG. 6). Lower corner mass dampeners 84-87 are attached to lower corner brackets 90-93 via lower corner mounts 96-99, respectively (see lower corner bracket 90 and lower corner mount 84 in FIG. 12). Collectively, the corner brackets 66-69 and 90-93, corner mass dampeners 60-63 and 84-87 and corner mounts 72-75 and 96-99 establish a passive suspension system for the 3D printer. Preferably, the mass dampeners are tuned to the most common mode of noise and vibration the 3D printing system will experience. Also preferably, the mass dampeners are made of a rubberized mechanical device (as depicted in FIGS. 3-19) or fluid (including gel). The mass dampeners could also be made of a foam or sponge material. FIGS. 9-14, described further below, show more details of the passive suspension system. Upper assembly 53 and lower assembly 77 are joined via vertical beams 101-104. In particular, vertical beams 101-104 connect upper corner mass dampeners 60-63 to lower corner mass dampeners 84-87, respectively. In a preferred embodiment, the chassis establishes approximately 1 cubic foot of internal build space which has been found to be a volume that facilitates ease of maneuverability of the 3D printing system.

Figure 7:
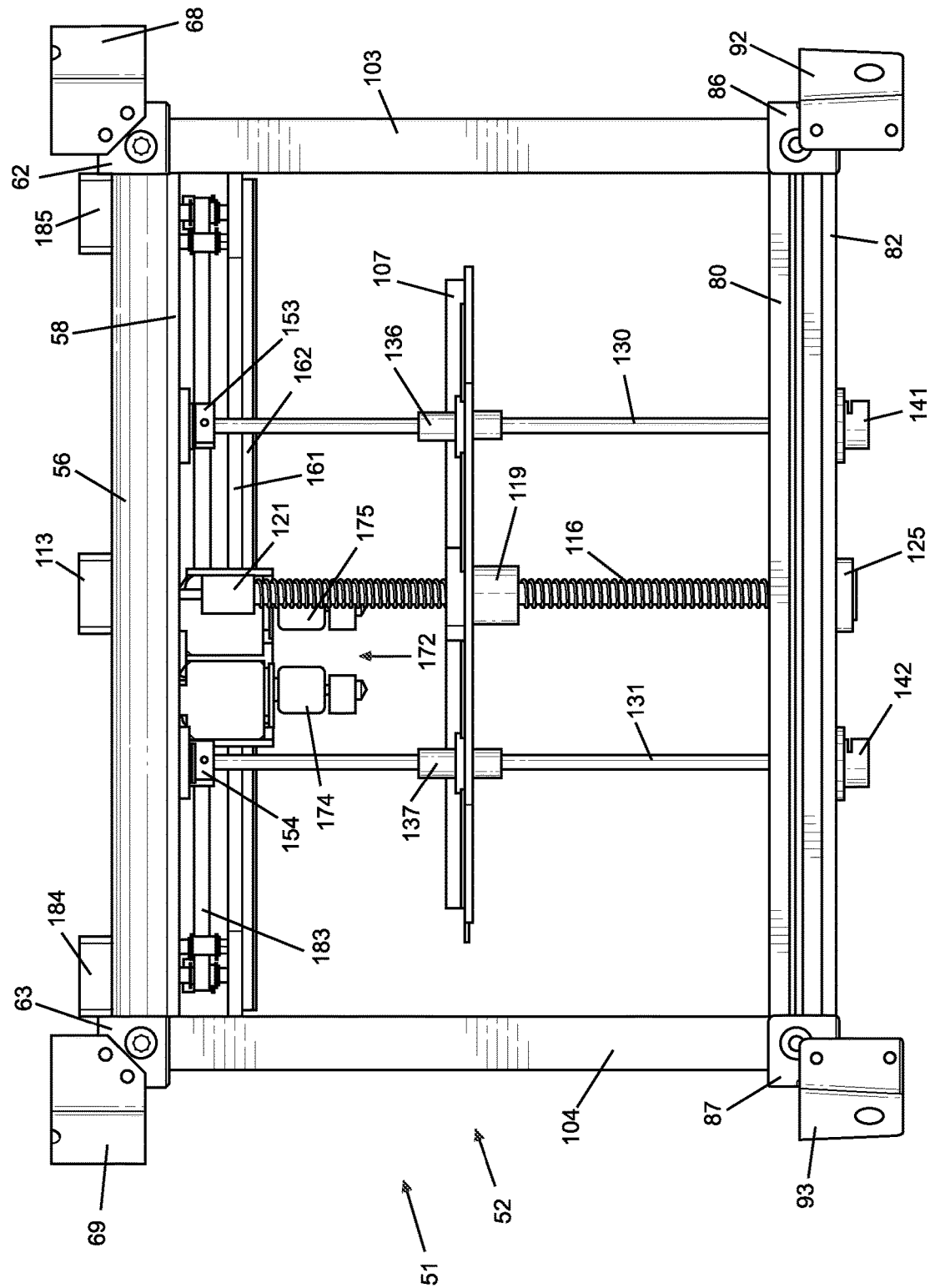
FIG. 7 is a front view of the 3D printer of FIG. 3.
Figure 8:
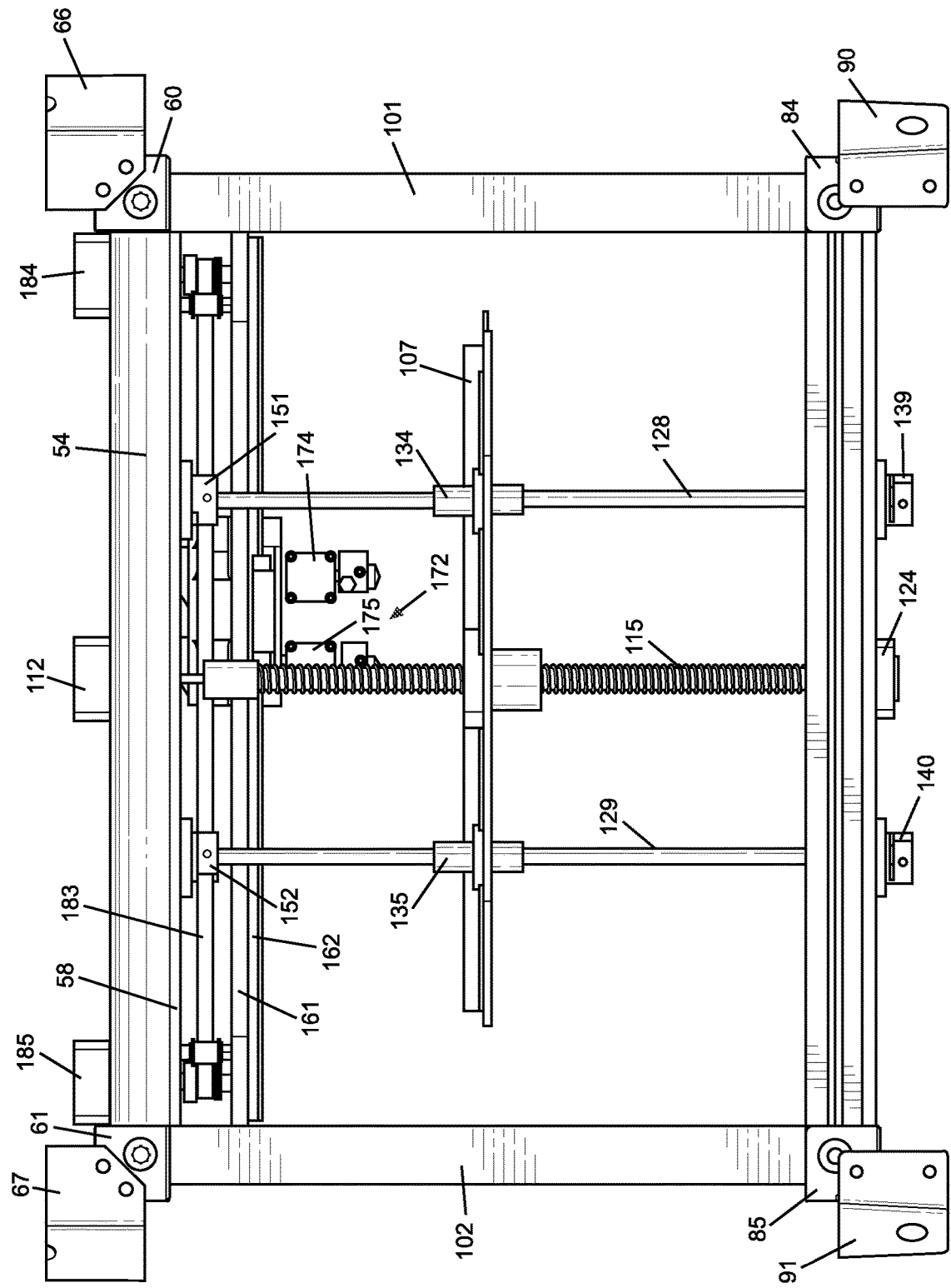
FIG. 8 is a back view of the 3D printer of FIG. 3.

As further shown in FIG. 3, 3D printer 51 includes a bed plate 107 upon which a 3D object is printed (e.g., by fused deposition modeling). The vertical position of bed plate 107 is adjusted by stepper motors 112 and 113 which drive the rotation of threaded screw shafts 115 and 116, respectively. Threaded screw shafts 115 and 116 are rotated within ballscrew nuts 118 and 119, respectively, which are attached to bed plate 107. Stepper motors 112 and 113, positioned upon upper mounting plate 58, are joined to upper portions of threaded screw shafts 115 and 116 via clamps 121 and 122, respectively. As shown in FIGS. 7 and 8, lower portions of threaded screw shafts 115 and 116 are joined to lower mounting plate 82 using clamps 124 and 125, respectively. Bed plate 107 is further supported by rods 128-131 which run parallel to threaded screw shafts 115 and 116 and pass through flanged bushings 134-137, respectively, which are attached to bed plate 107. Rods 128-131 are secured to lower mounting plate 82 by lower mounts 139-142, respectively, and to upper mounting plate 58 by upper mounts 151-154, respectively.

Figure 5:
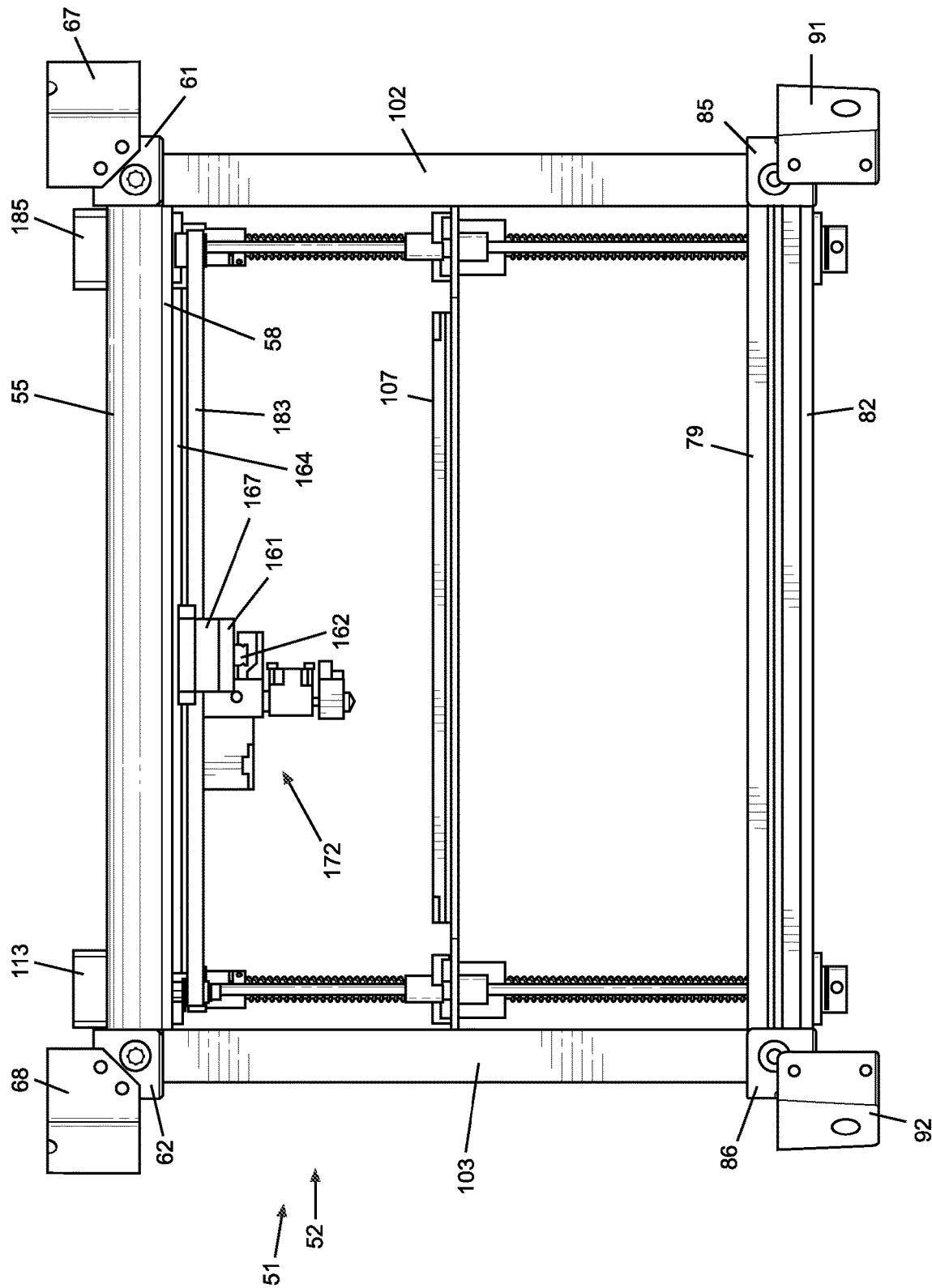
FIG. 5 is a right-side view of the 3D printer of FIG. 3.
Figure 6:
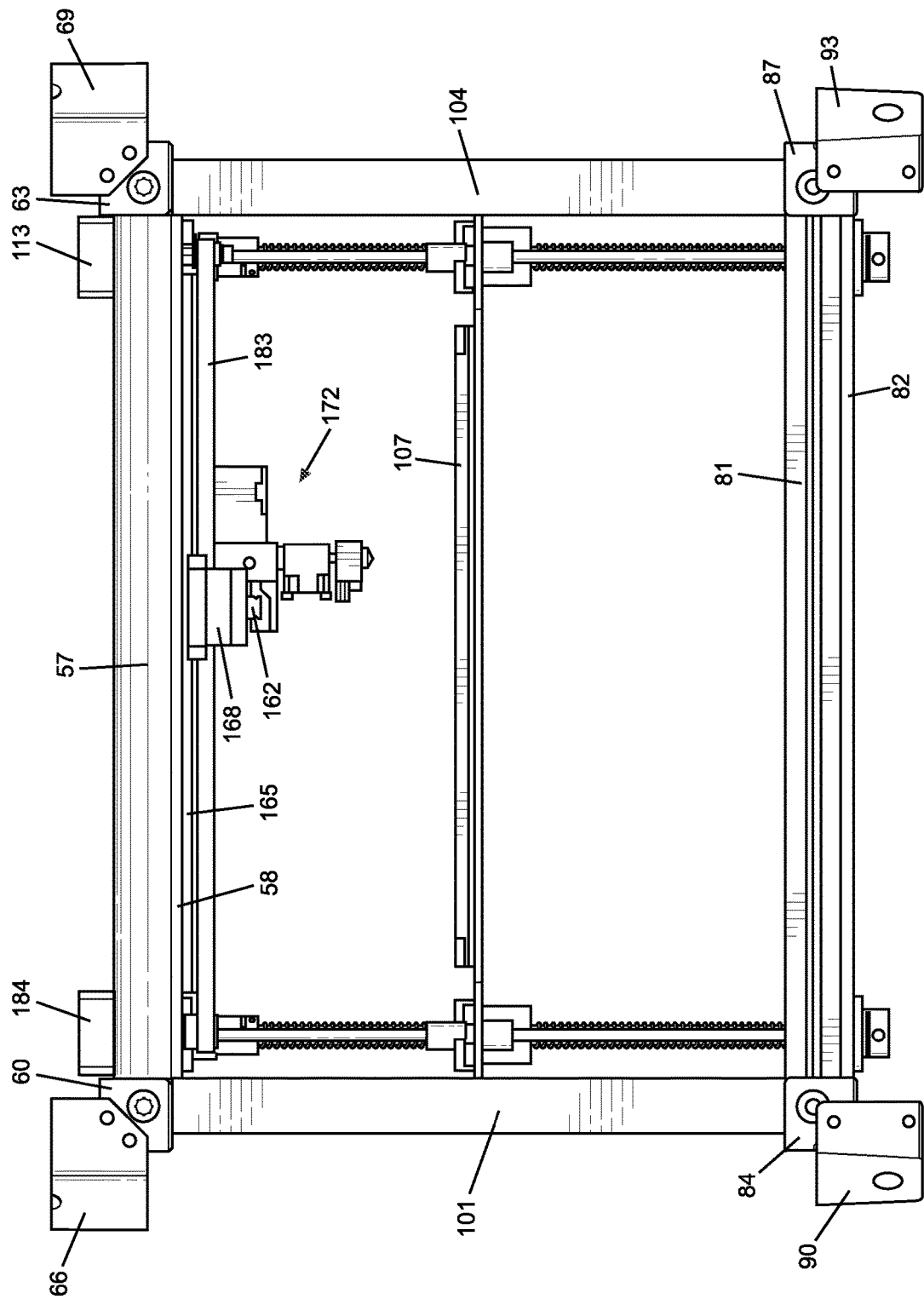
FIG. 6 is a left side view of the 3D printer of FIG. 3

FIGS. 3-8 also show that 3D printer 51 includes a y-bar 161. As shown in FIG. 5, y-bar 161 has a rail 162 on its underside. Y-bar 161 is mounted underneath upper mounting plate 58 and upon side rails 164 and 165 (see, particularly, FIGS. 5 and 6) with the help of spacers 167 and 168. Together y-bar 161 and its rail 162 support a hot end assembly 172. Hot end assembly 172 includes a mount 173, a first extruder 174 and a second extruder 175. Hot end assembly 172 functions, in an FDM 3D printing process, to melt a ductile filament material which is to be deposited upon bed plate 107 by first extruder 174 and/or second extruder 175 to form a 3D object. Hot end assembly 172 is moved as needed during the printing process along y-bar 161 (and its rail 162) and/or along side rails 164 and 165 using a belt 183 that is controlled by step motors 184 and 185 and various pulleys (not separately labeled). Simultaneously, bed plate 107 is raised and lowered as needed during the printing process.

Figure 9:
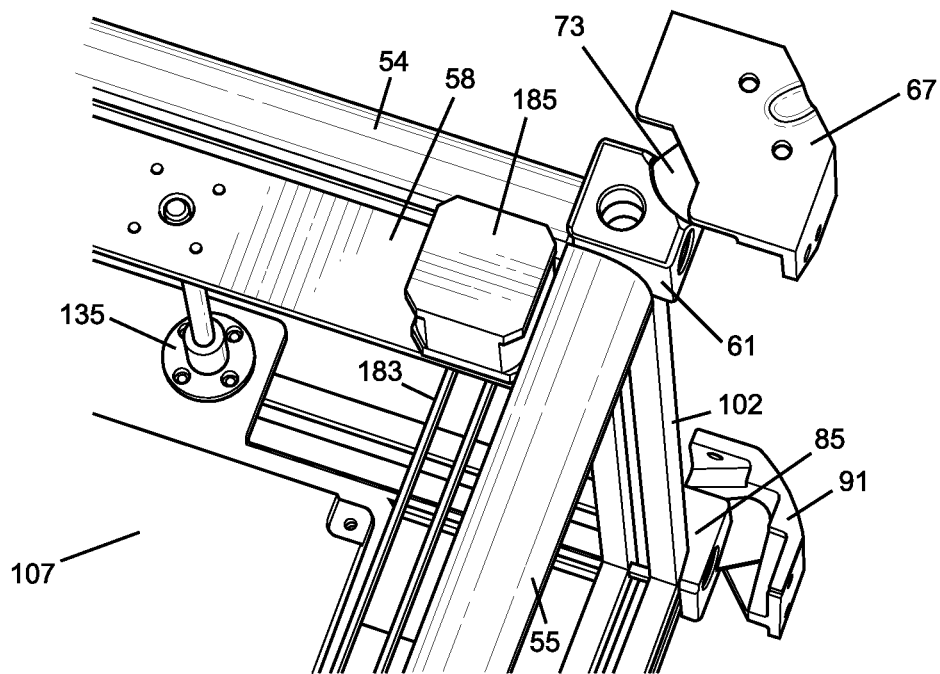
FIG. 9 is a partial upper perspective view of the 3D printer of FIG. 3 showing an upper corner bracket and a lower corner bracket.
Figure 10:
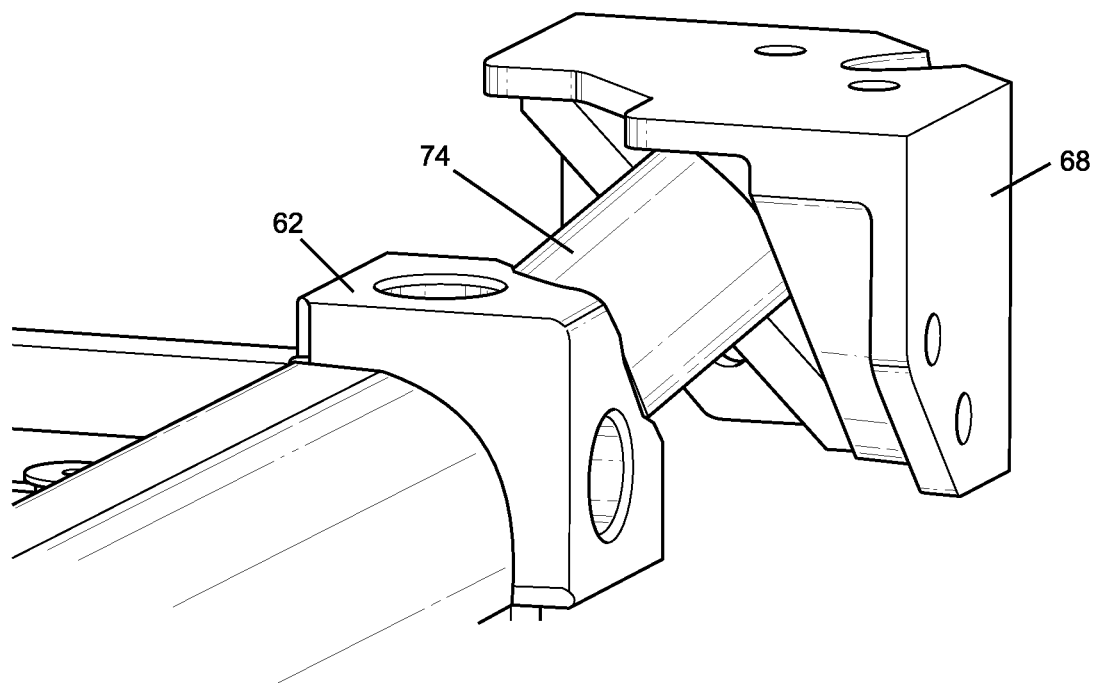
FIGS. 10 and 11 are partial perspective views of the 3D printer of FIG. 3 showing other upper corner brackets along with upper corner dampeners.
Figure 11:
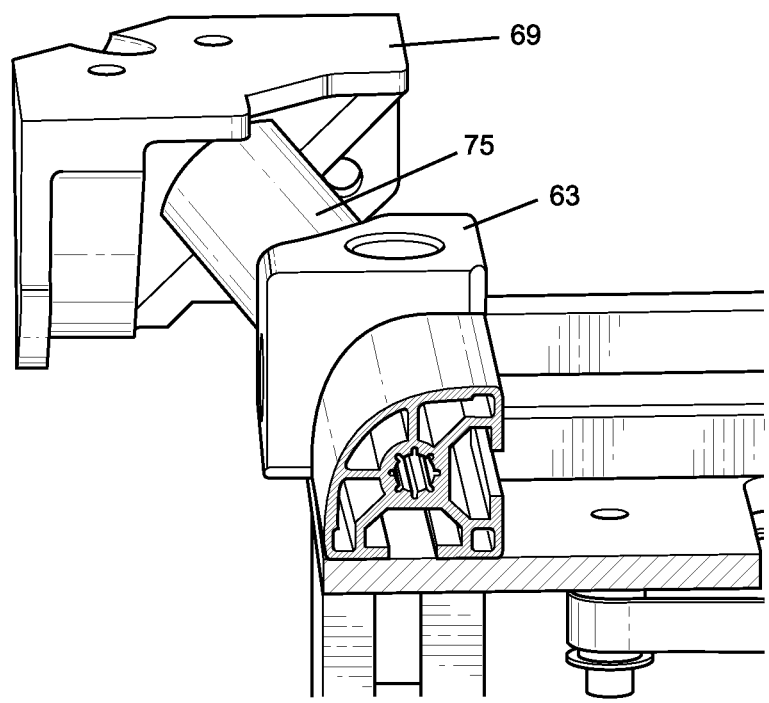
Figure 12:
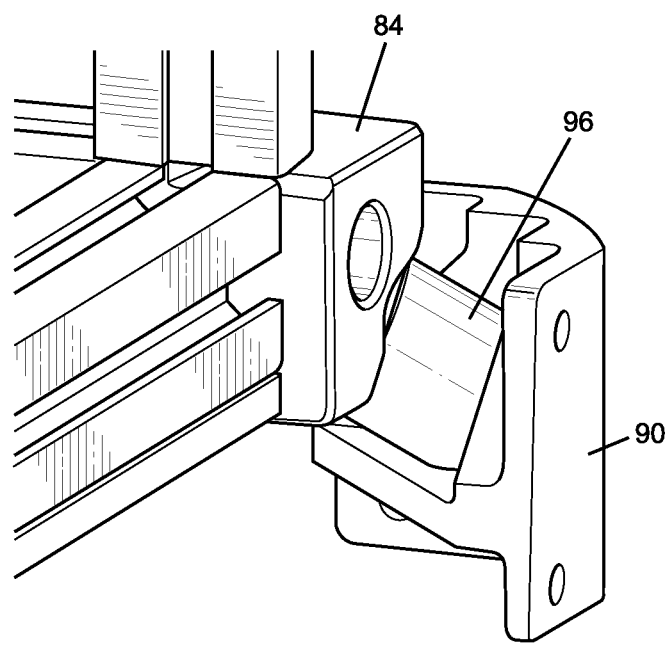
FIG. 12 is a partial perspective view of a lower corner bracket of the 3D printer of FIG. 3.
Figure 14:
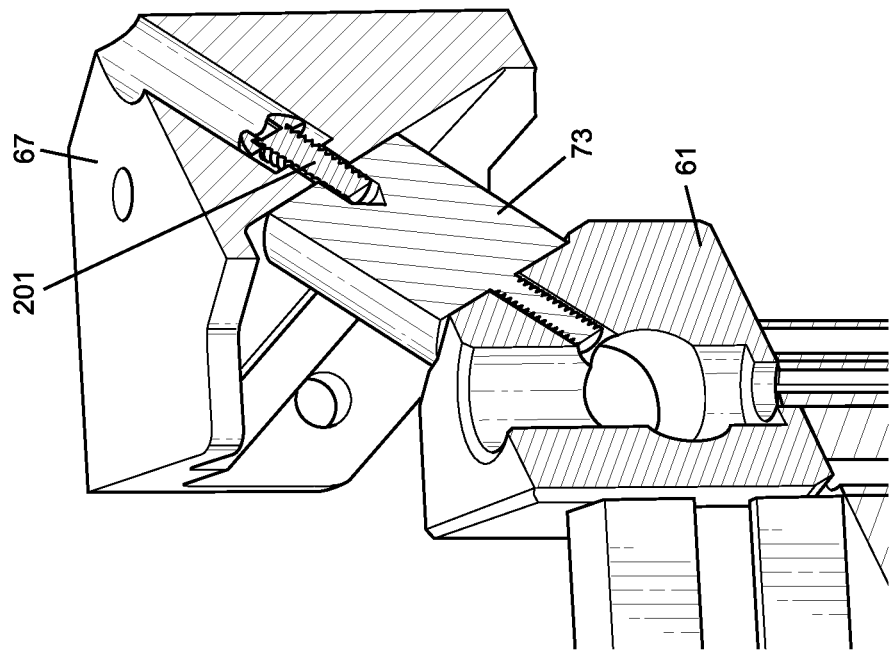
FIG. 14 is a cross-sectional view of an upper corner bracket and an upper corner dampener of the 3D printer of FIG. 3.
Figure 13:
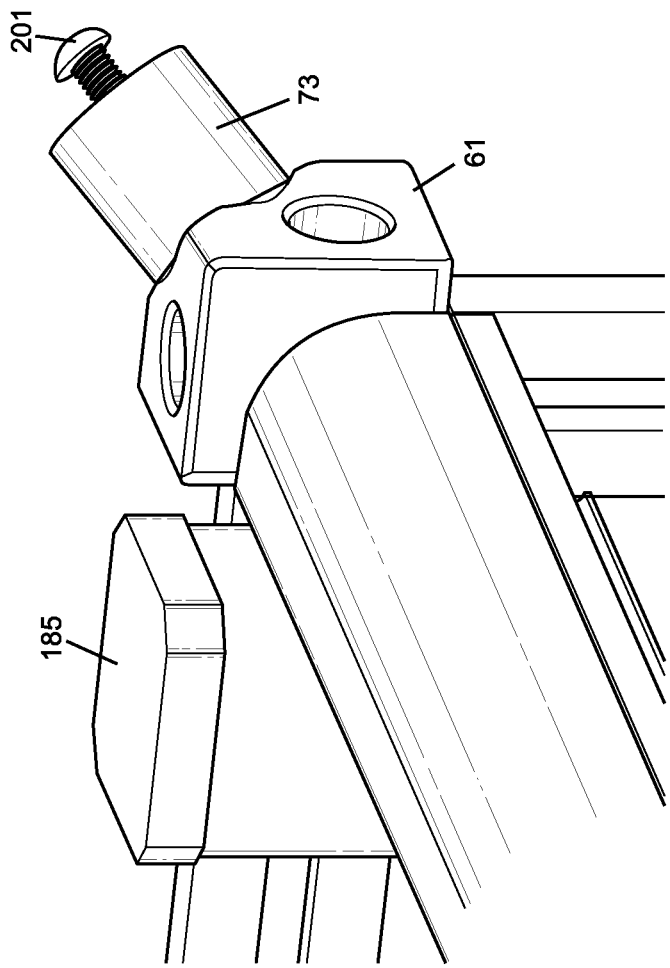
FIG. 13 is a partial perspective view of the 3D printer of FIG. 3 showing an upper corner bracket removed.
Figure 15:
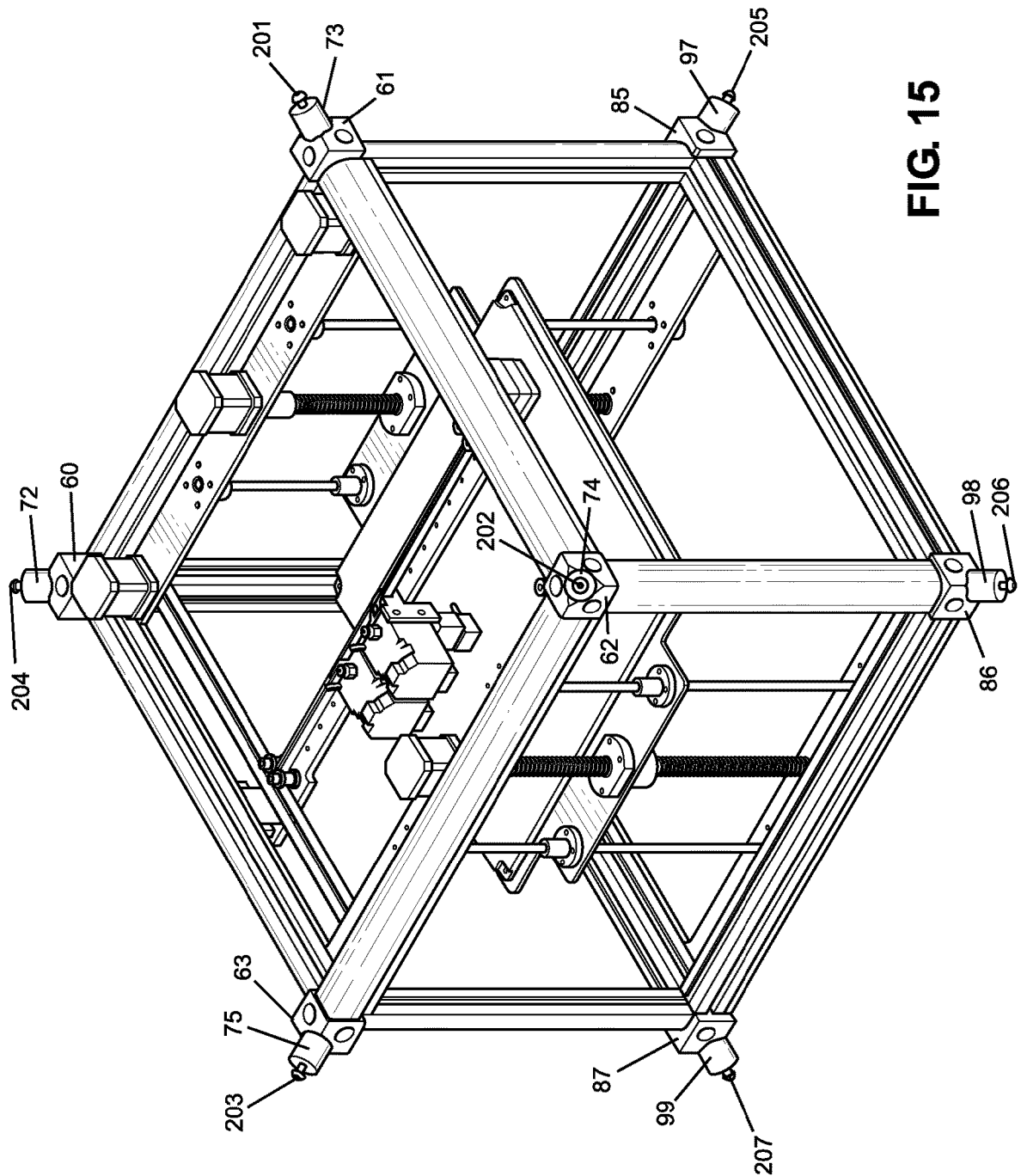
FIG. 15 is an upper perspective view of the 3D printer of FIG. 3 with its corner brackets removed.
Figure 16:
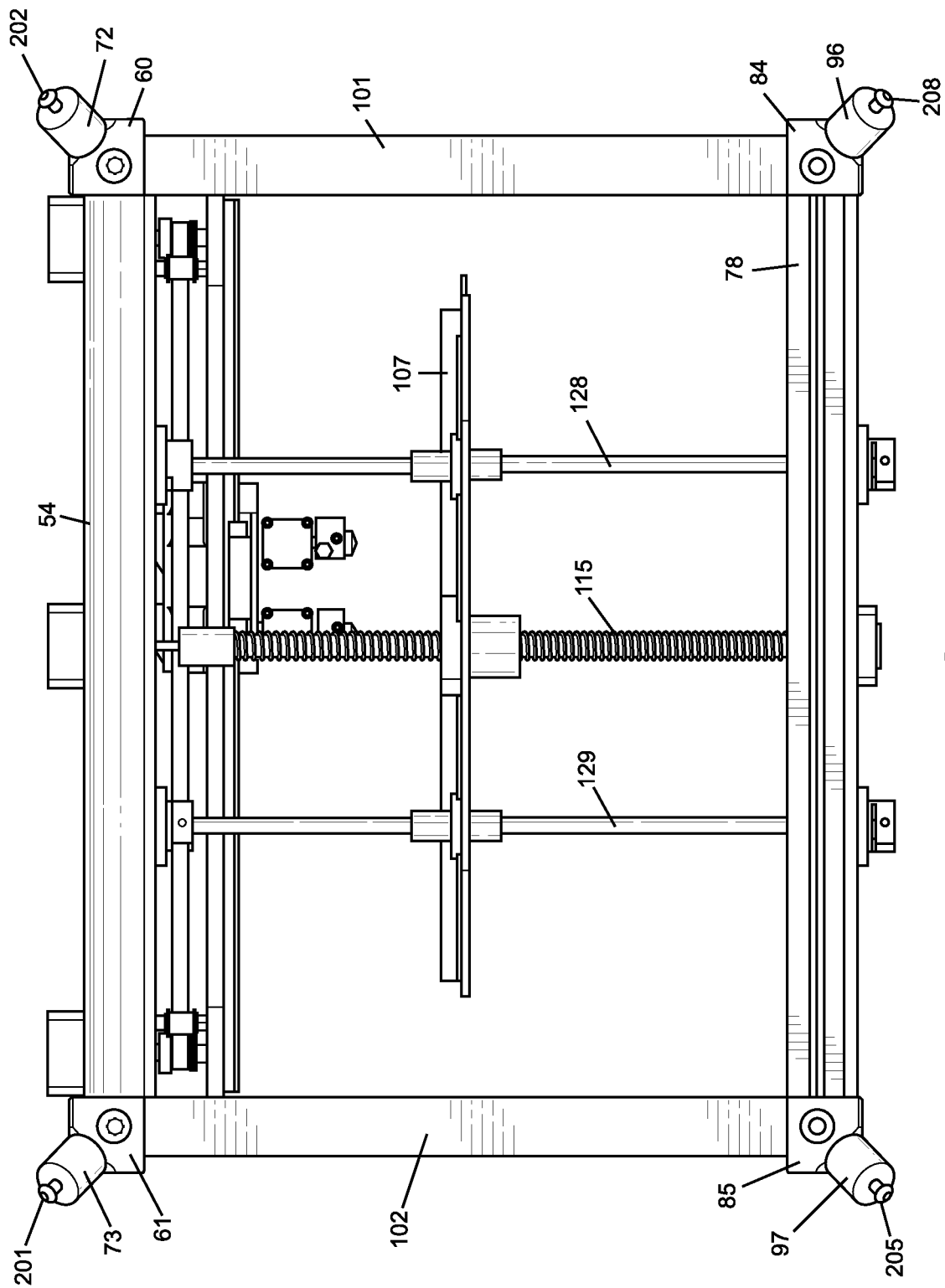
FIG. 16 is a back view of the 3D printer of FIG. 15.
Figure 17:
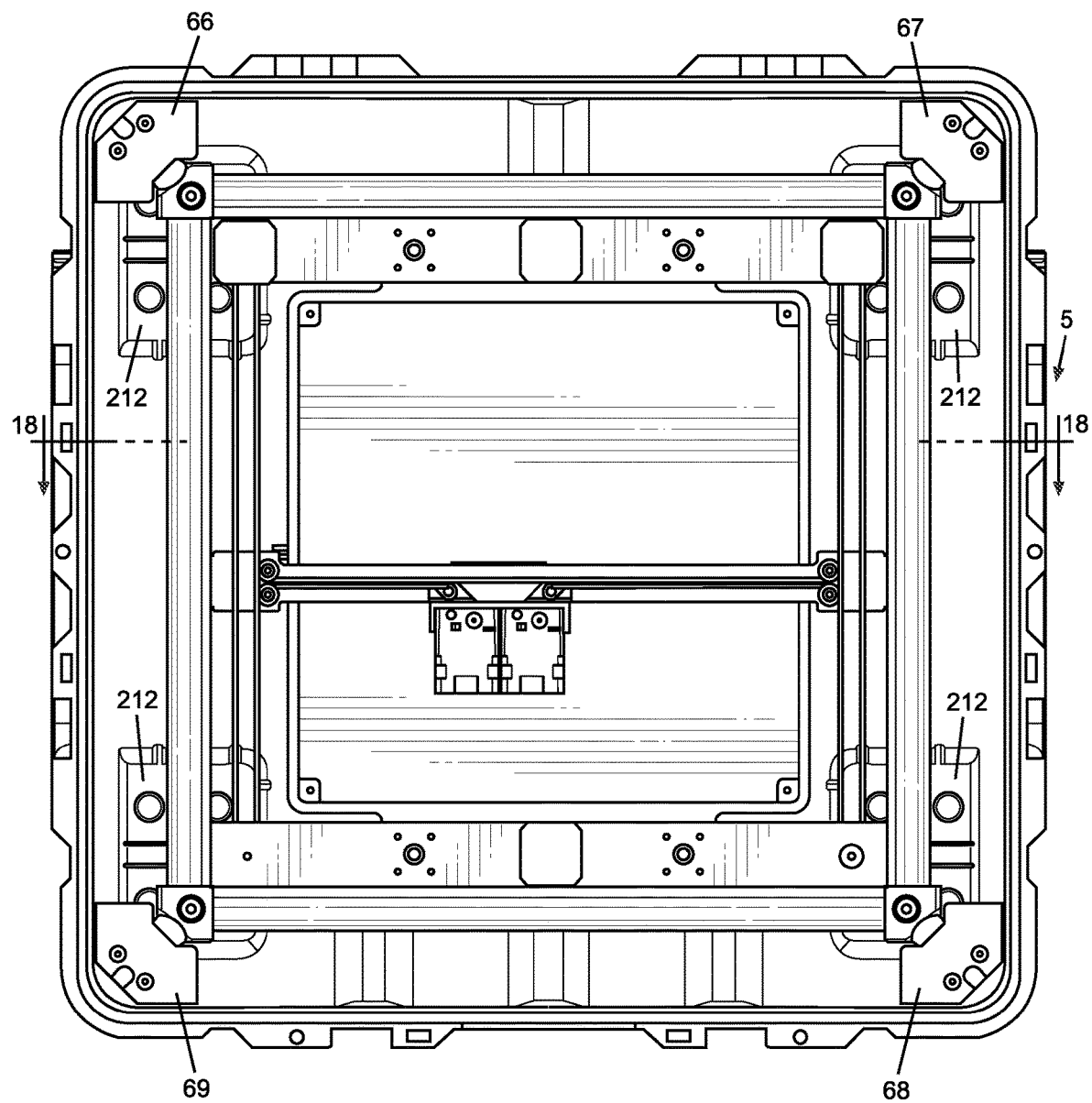
FIG. 17 is a top view of the 3D printer of FIG. 2 housed within the body of the enclosure.

FIGS. 9-18 show more details regarding the passive suspension system employed by 3D printer 51. In particular, FIG. 9 shows upper corner dampener 61 and upper corner bracket 67 in relation to lower corner dampener 85 and lower corner bracket 91. In use, brackets 67 and 91 contact the interior surface of body 5 to facilitate shock absorption by mass dampeners 61 and 85, respectively (FIG. 17 shows bracket 67 in contact with the interior surface of body 5). Each of the other brackets also contacts the interior surface of body 5 to facilitate shock absorption (FIG. 18 shows brackets 68, 69, 92 and 93 in contact with the interior surface of body 5). FIGS. 10-12 show other brackets of 3D printer 51, specifically upper corner bracket 68, upper corner bracket 69 and lower corner bracket 90, respectively. As shown in FIGS. 13 and 14, an upper dampener screw 201 is used to secure upper corner bracket 67 to upper corner mount 73. Upper corner mount 73 has a threaded portion (not separately labeled) which helps secure upper corner mount 73 to upper corner dampener 61. Similar to dampener screw 201, dampener screws 202-204 and 205-208 (shown in FIGS. 15 and 16) are used to secure brackets 66, 68, 69 and 90-93 to their respective mounts 60, 62, 63 and 96-99. Of course, other fastening arrangements could be employed.

FIGS. 17 and 18 show further views of the 3D printer 51 residing within body 5 of enclosure 4. Interior bumpers 212 help support chassis 52 of the 3D printer, at lower assembly 77 thereof. Preferably, the interior bumpers are made of isolation foam to insulate the climate and atmosphere within the sealed chamber and help mitigate impacts for shock-absorption.

FIG. 19 shows another embodiment of a 3D printing system in accordance with the present invention. In contrast to 3D printing system 1 of FIG. 1 which opens at a top portion 38 of body 5, a 3D printing system 221 of FIG. 19 opens at a side portion of a body 222 thereof. In particular, as shown, system 221 is openable at back side 223 and/or front side 224 to access a 3D printer 225.

Figure 20:
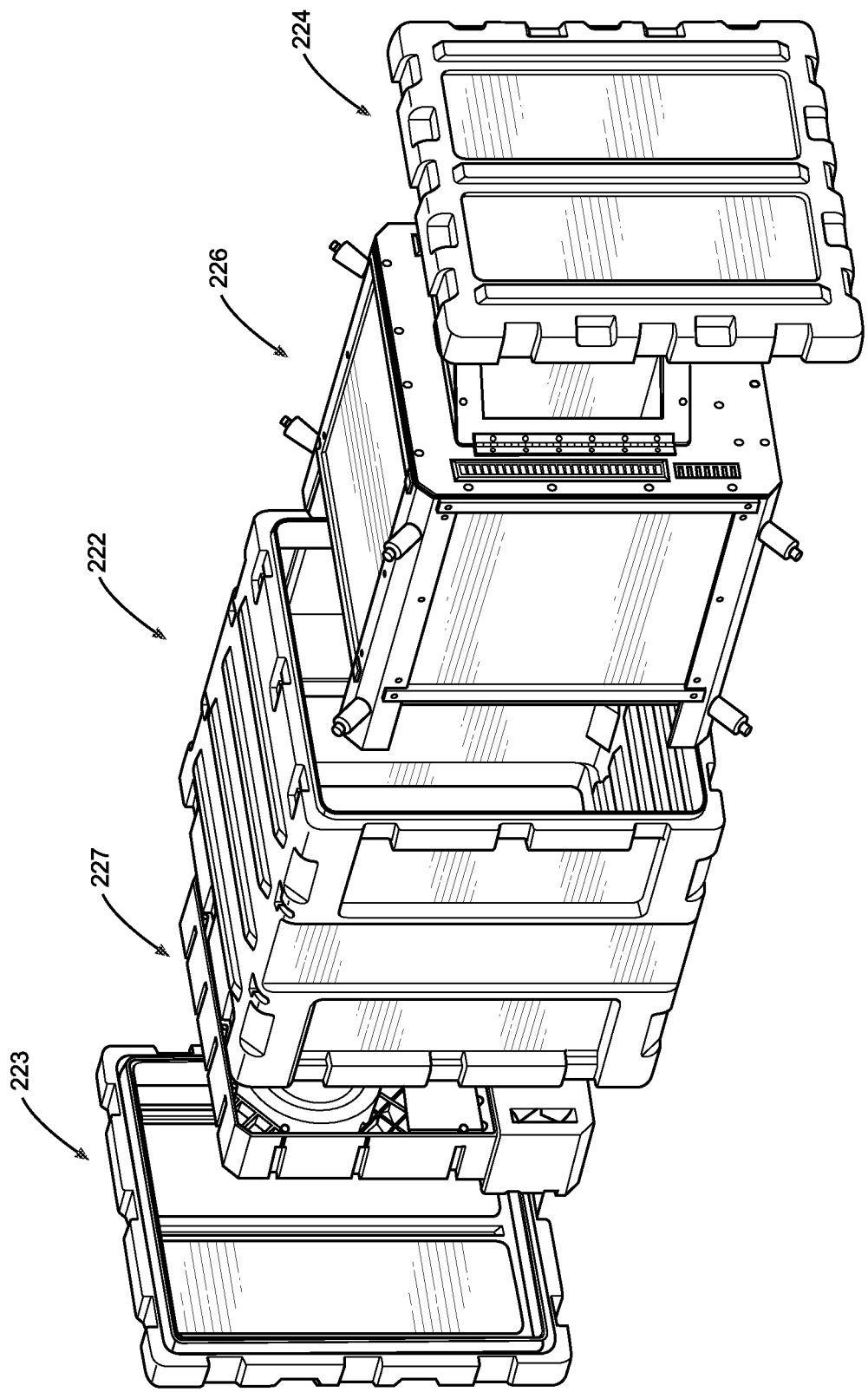
FIG. 20 is a front exploded view of another side-opening embodiment of the 3D printing system in accordance with the present invention in which the 3D printer has an enclosed print chamber.
Figure 21:
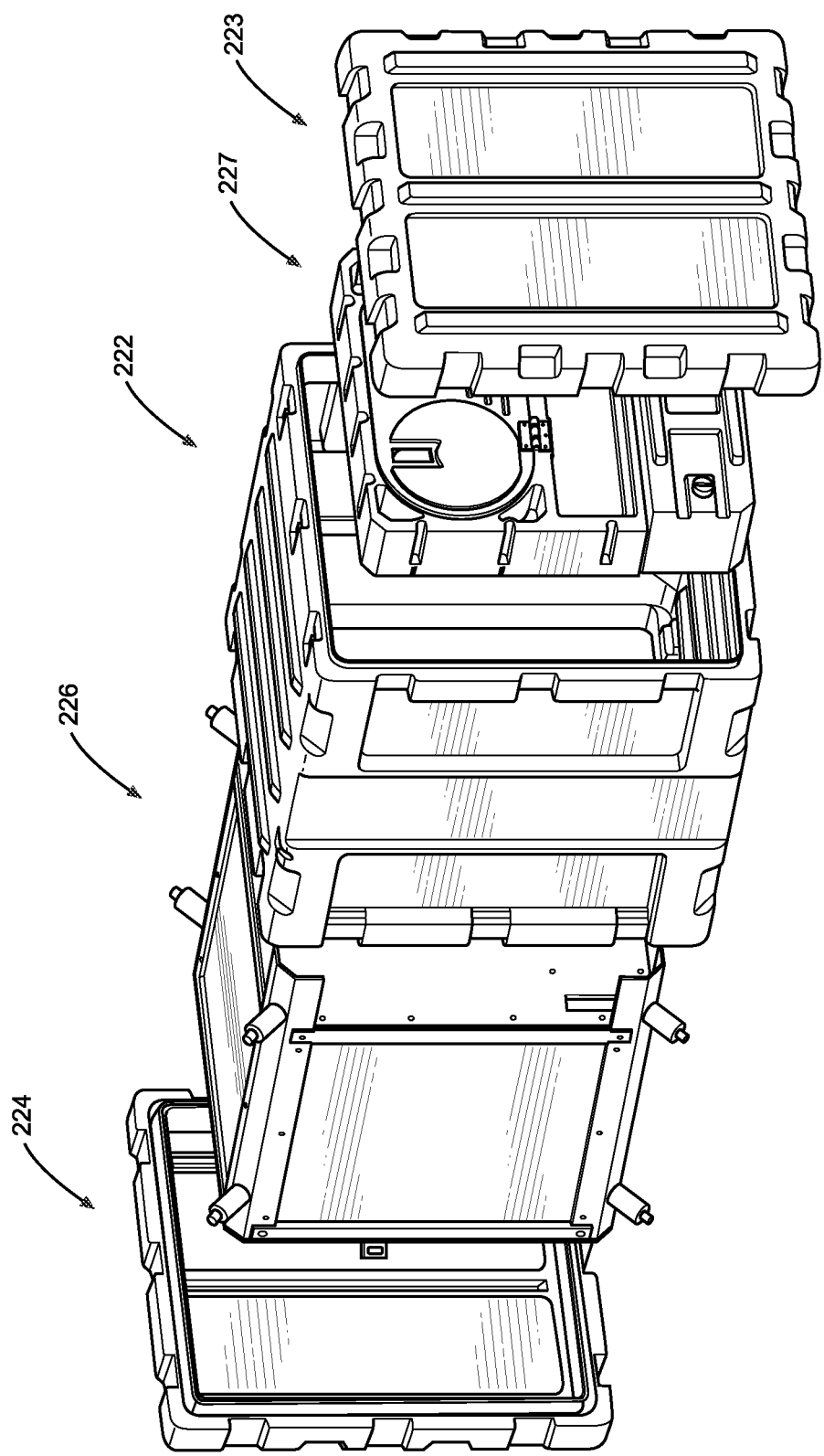
FIG. 21 is a rear exploded view of the 3D printing system of FIG. 20.

FIGS. 20 and 21 show another embodiment of a 3D printing system in accordance with the present invention. Similar to the embodiment shown in FIG. 19, the embodiment of FIGS. 20 and 21 opens at a back side 223 and/or front side 224. However, in the embodiment of FIGS. 20 and 21, the accessible 3D printer has an enclosed print chamber 226. In addition, a separate control module 227, which includes the structural components of control housing 19 of system 1 as detailed further below with particular reference to FIG. 22, is provided and linked to the 3D printer.

Figure 22:
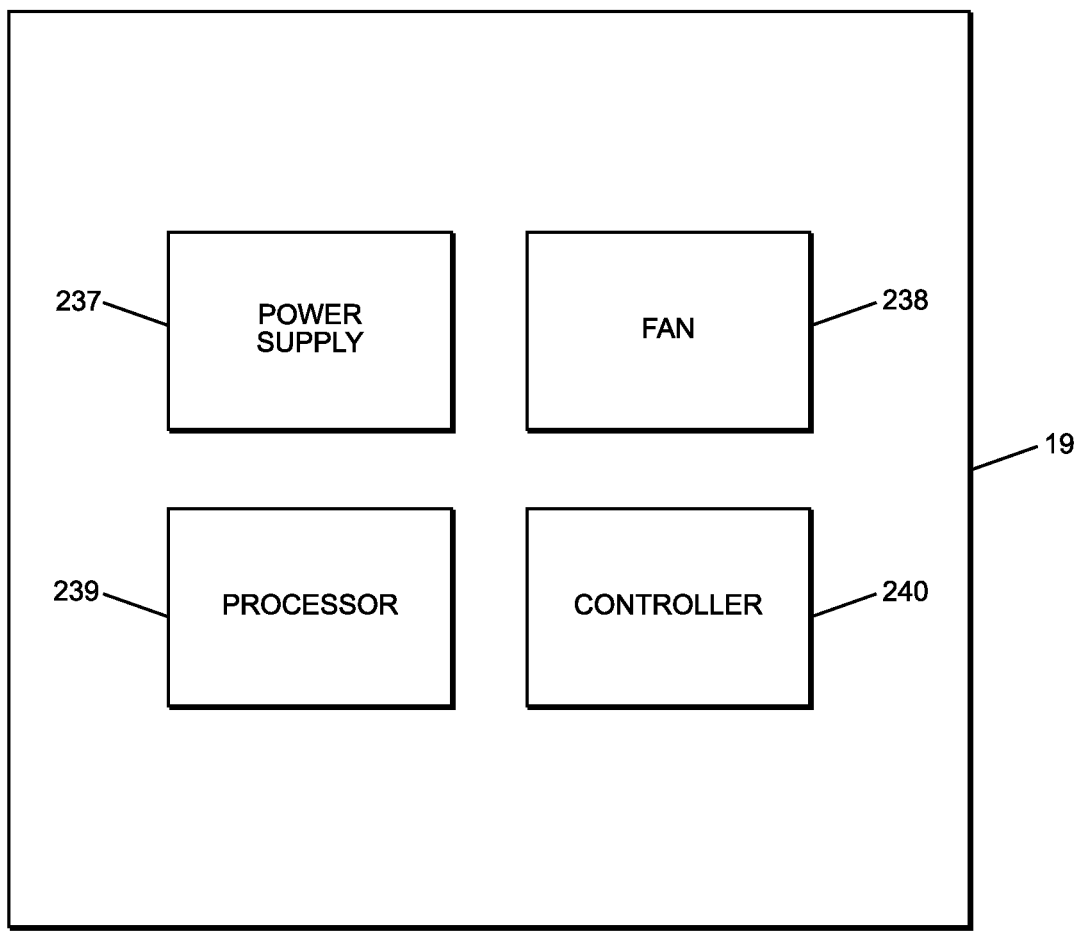
FIG. 22 is a schematic view of the components within an electronics housing of a 3D printing system in accordance with the present invention.

FIG. 22 gives an overview of components that reside within electronics housing 19 of 3D printing system 1 (or within control module 227 of printing system 221). In particular, within electronics housing 19 reside a power supply 237, a fan 238, a processor 239 and a controller 240. Processor 239 and controller 240 work together, along with user interface 17, one or more sensors 244 and a potential network of 3D printers 245 to operate 3D printing system 1.

Figure 23:
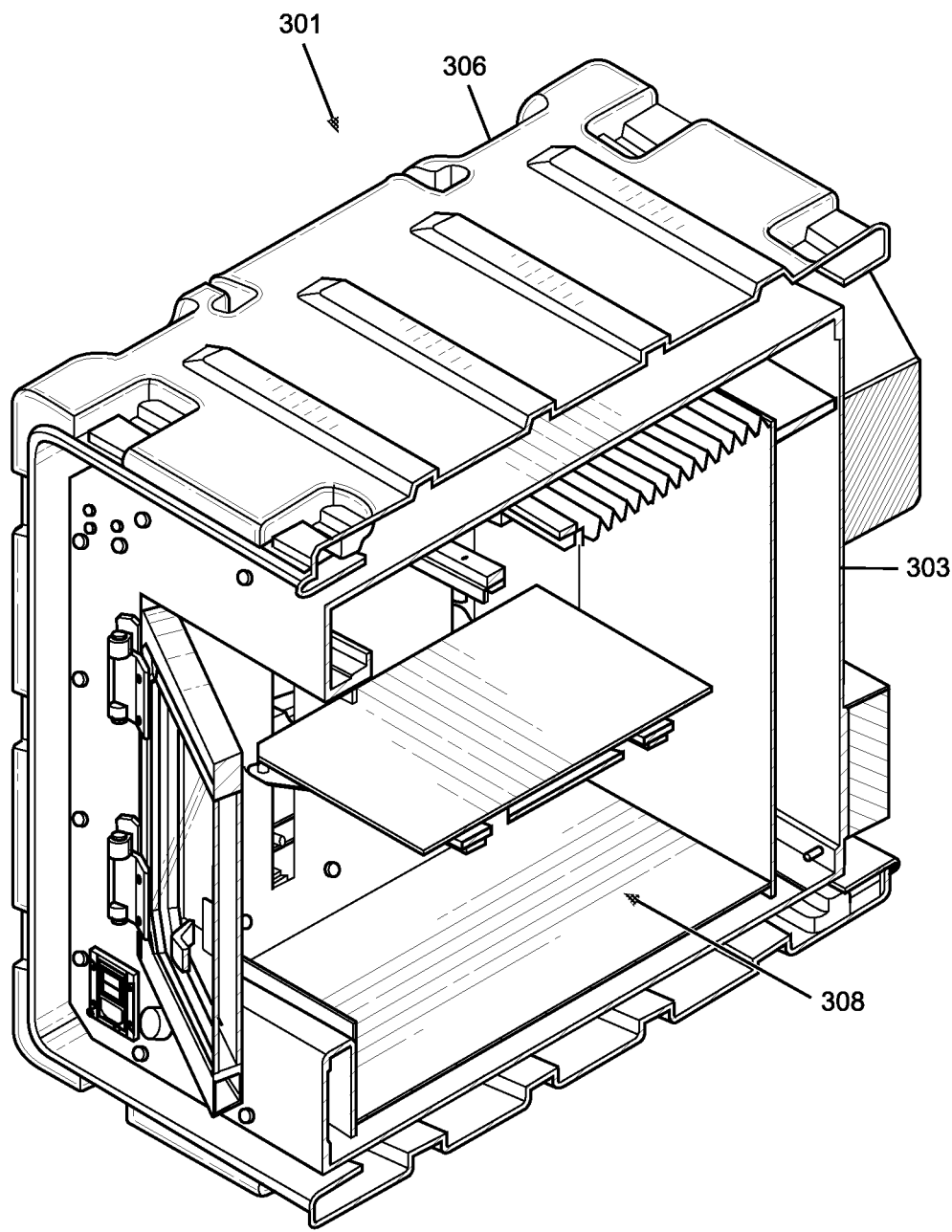
FIG. 23 shows a cross-section of another embodiment of a 3D printing system in accordance with the present invention.

FIG. 23 shows a cross-section of another embodiment of a 3D printing system in accordance with the present invention. Similar to the embodiments shown in FIGS. 20 and 21, a 3D printer system 301 opens from the side (e.g., front) and has a sealed chamber 303 within a rugged shell 306. 3D printer system 301 is defined by a three-chamber structure. The first chamber is provided by rugged shell 306. Sealed chamber 303 is the second chamber and seals the printer and electronics systems. Inner chamber 308 is the third chamber, an internal, thermally insulated chamber that is heated to maintain a stable operating print chamber temperature in various print environments. Each chamber provides independent benefits to the overall system in austere environments.

Figure 24:
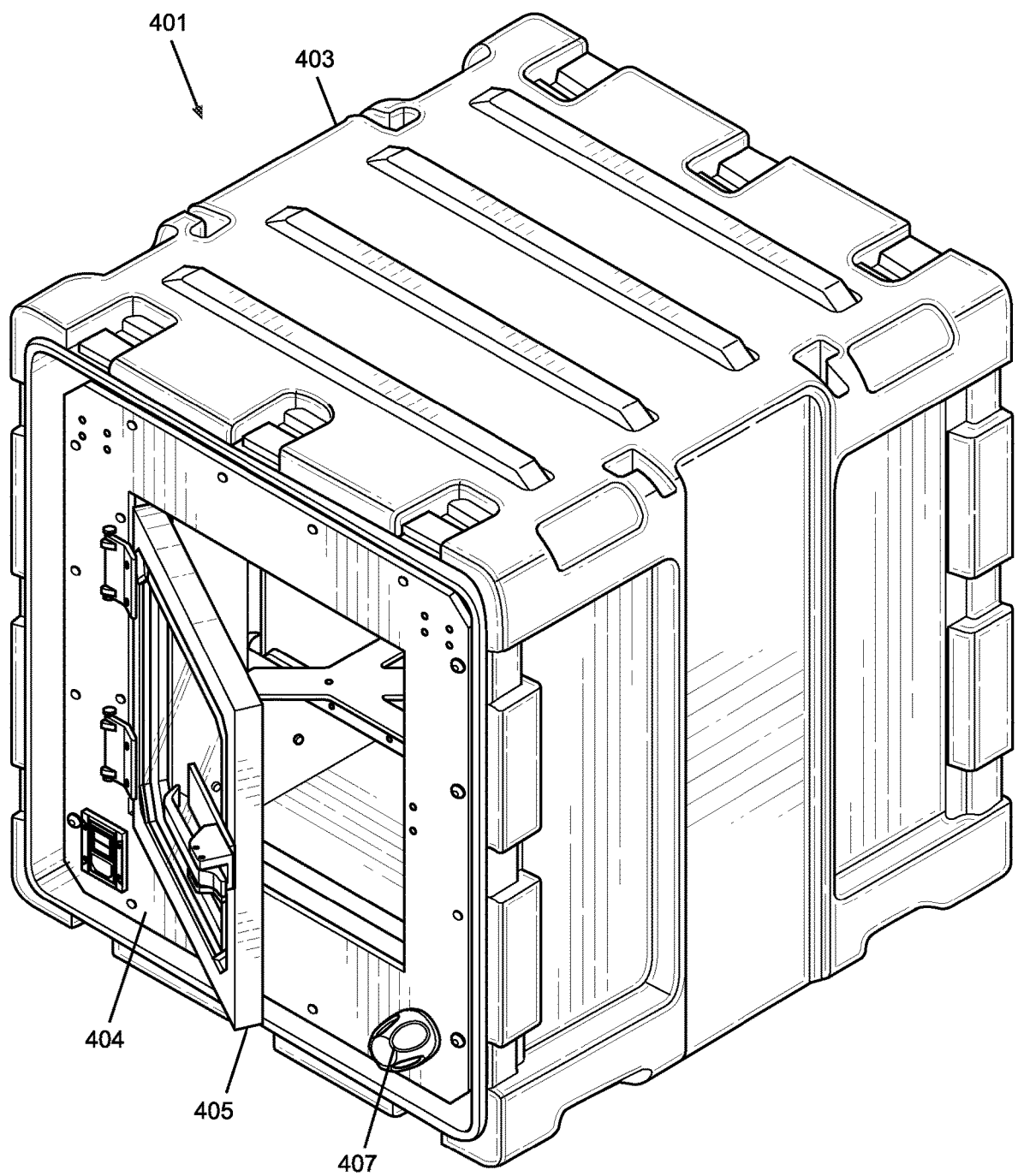
FIG. 24 shows a perspective view of an embodiment of a 3D printing system in accordance with the present invention including three layers of walls.

Similar to the embodiment shown in FIG. 23, a 3D printing system of 401 of FIGS. 24-29 has an overall structure defined by three layers of walls. As shown in FIG. 24, the first layer is an outer wall/enclosure 403 which is a sealed shell case. Preferably, outer enclosure 403 meets United States Military Standard MIL-STD-810G for water and dust resistance. A lid 404 includes a door 405 which is preferably made of a double wall polycarbonate to reduce heat loss while avoiding the use of fragile materials, like glass. A sensor blister 407 on lid 404 allows system 401 to collect environmental data (e.g., temperature, humidity, air quality, pressure). See "Climate and atmospheric control" section below.

Figure 25:
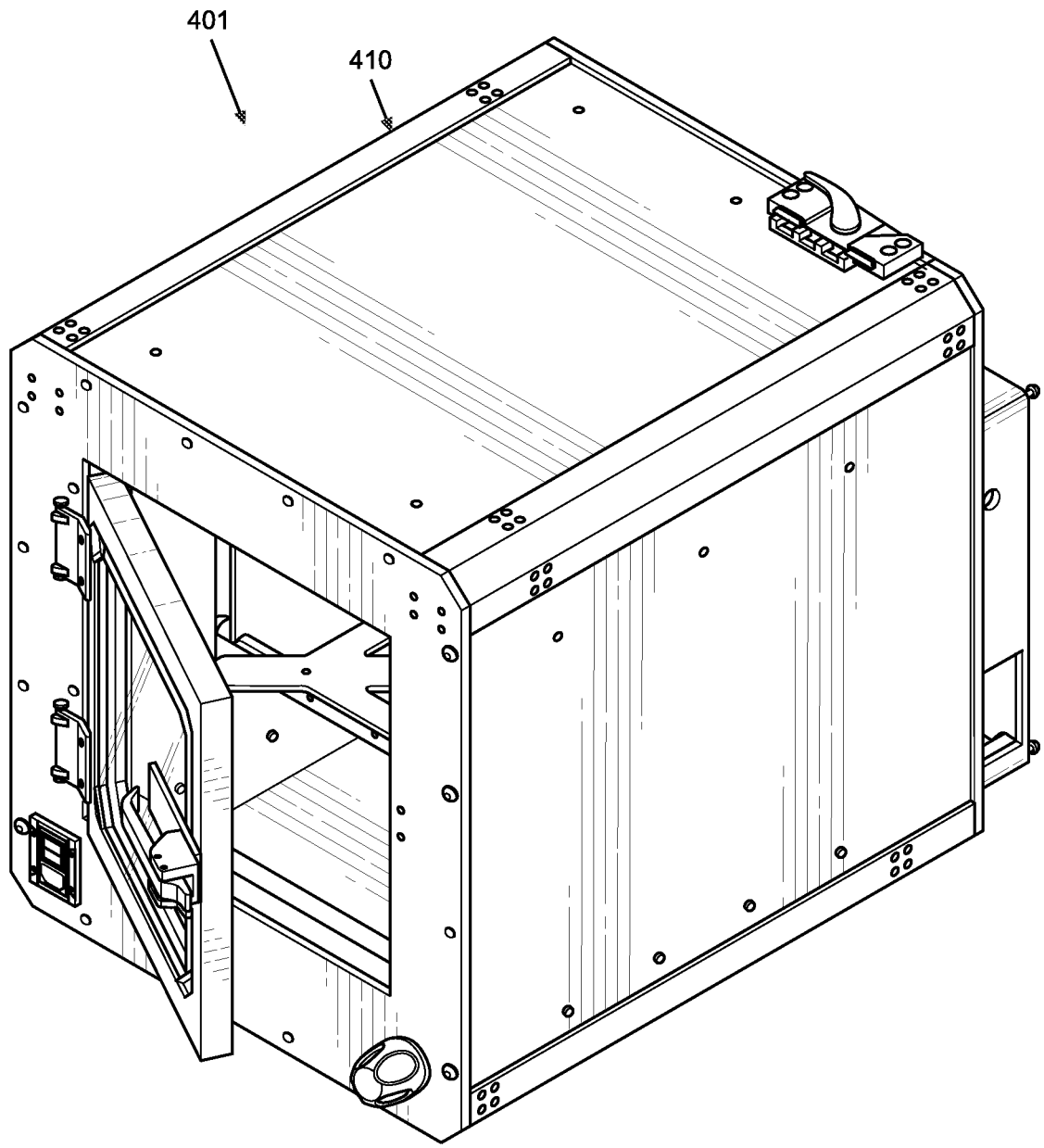
FIG. 25 shows the 3D printing system of FIG. 24 with its outside wall removed.

As shown in FIG. 25, which shows 3D printing system 401 without outer enclosure 403, a printer enclosure 410 represents the second layer. Between outer enclosure 403 and printer enclosure 410 are shock absorbers/tuned mass dampeners as previously discussed. See also FIG. 30, which is discussed below. Outer enclosure 403 can be a transportation case within which printer enclosure 410 stays permanently or not. When printer enclosure 410 is not within outer enclosure 403 it could be slid into shelves/frames/slots/racks, e.g., upon vehicles/ships, which are designed to hold printer enclosure 410 (similar to how printer enclosure 410 would be slid into outer enclosure/transportation case 403).

Figure 26:
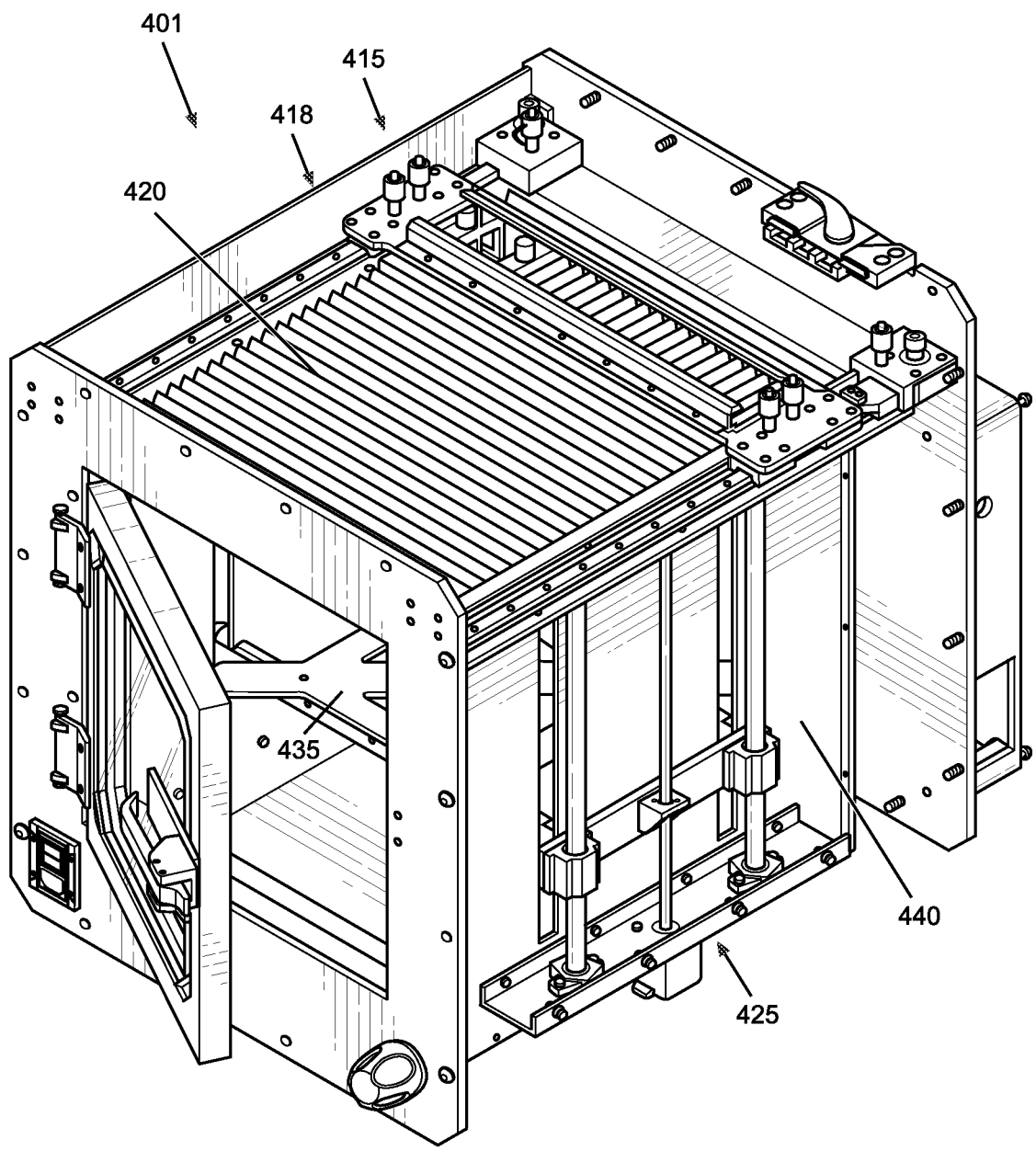
FIG. 26 shows the 3D printing system of FIG. 25 with its printer enclosure partially removed.
Figure 27:
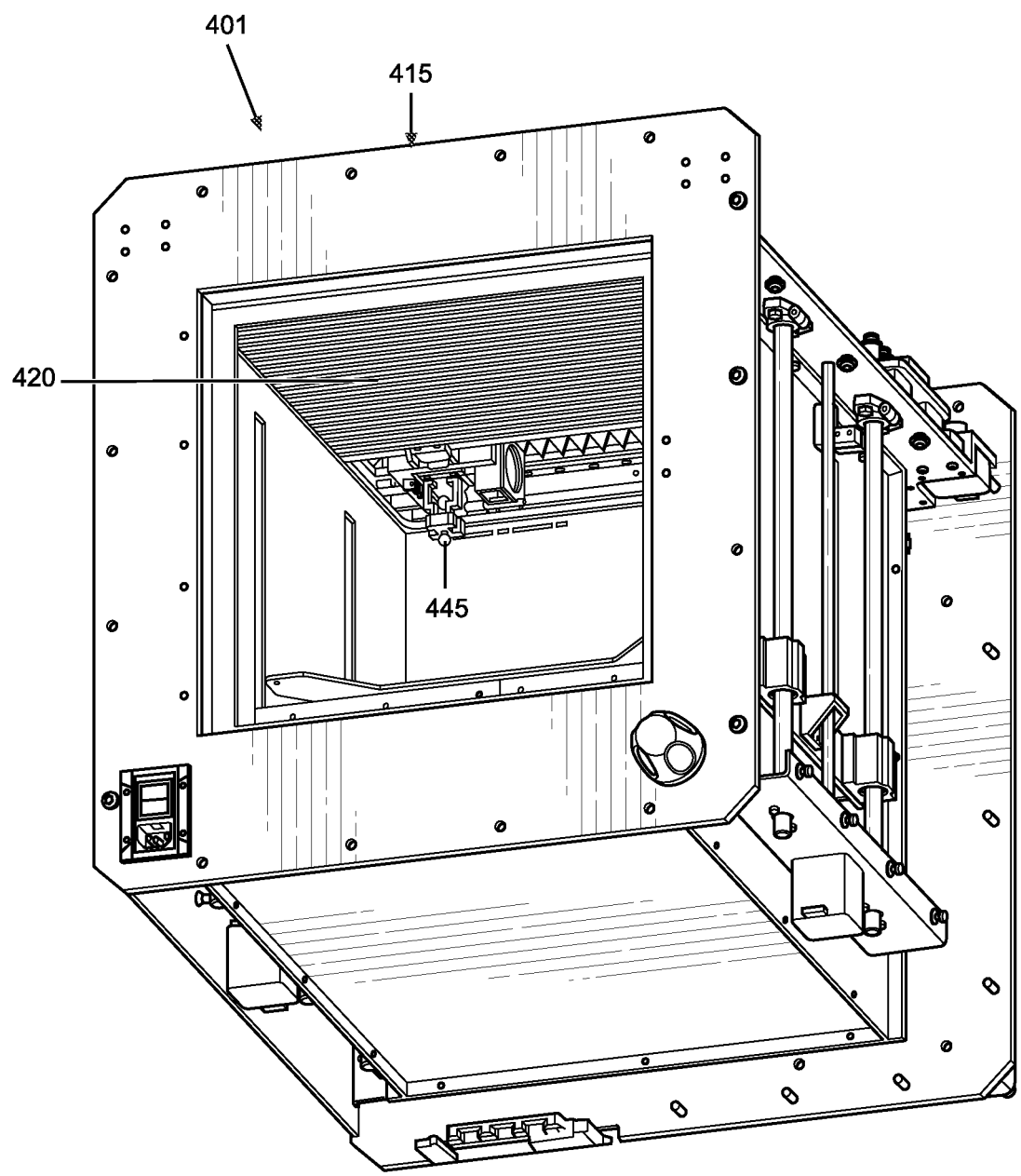
FIG. 27 shows an underside of the 3D printing system of FIG. 26.

The third layer of 3D printing system 401 is a print chamber 415, which is best seen in FIGS. 26 and 27 which show printing system 401 without outer enclosure 403 and partially without printer enclosure 410. Between printer enclosure 410 and print chamber 415 is thermal insulation and an air gap to insulate print chamber 415 from electronics outside print chamber 415 and from printer enclosure 410. Print chamber 415 contains one or more heaters to manage the internal chamber temperature as needed for various types of 3D printing polymer filaments. A top 418 of print chamber 415 is sealed using silicon coated fiberglass bellows 420 that provide thermal insulation and reduce airflow in and out of print chamber 415 from the gap between printer enclosure 410 and print chamber 415. A z elevator 425 (i.e., the linear rods and stepper motor driven lead screw on the sides of print chamber) lifts and lowers an internal print bed 435. See above description regarding the vertical position of bed plate 107 in FIG. 3 being adjusted by stepper motors 112 and 113, threaded screw shafts 115 and 116, etc. Rubber sheeting 440 is used to seal rectangular gaps made by z elevator 425 on the sides of print chamber 415. FIG. 27 is a bottom perspective view showing bellows 420 as well as a high temperature (up to 500° C.) extruder/hot-end 445 that passes below bellows 420.

Figure 28:
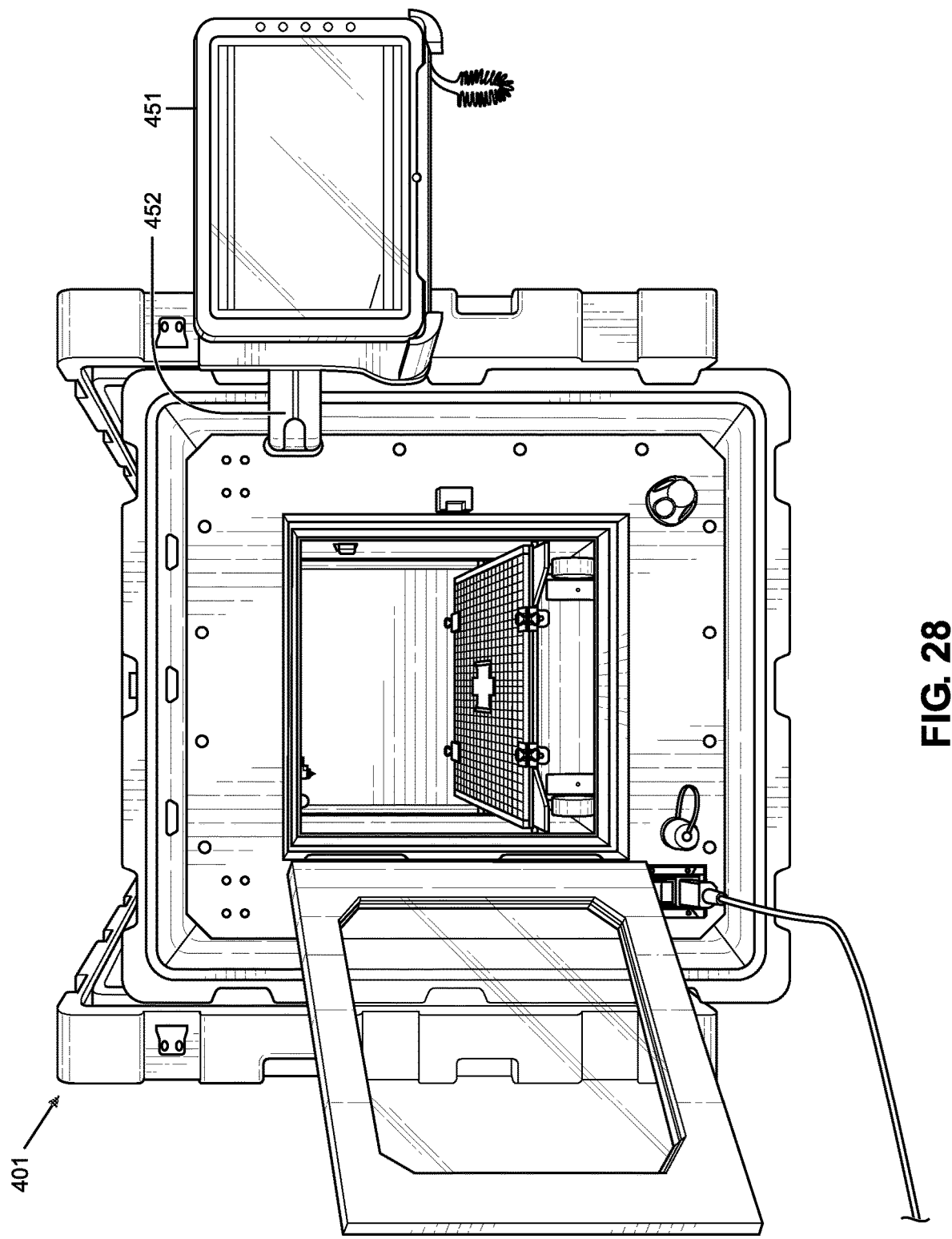
FIG. 28 shows the 3D printing system of FIG. 24 together with a mounted tablet computer.

FIG. 28 shows 3D printing system 401 together with a tablet computer 451 mounted on an arm 452 attached to system 401. Tablet computer 451 provides a single point of access for controlling and locking the system and relies upon the onboard cybersecurity of the tablet operating system. See the below discussion of FIG. 31 regarding tablets mounted to 3D printing systems of the present invention.

Figure 29:
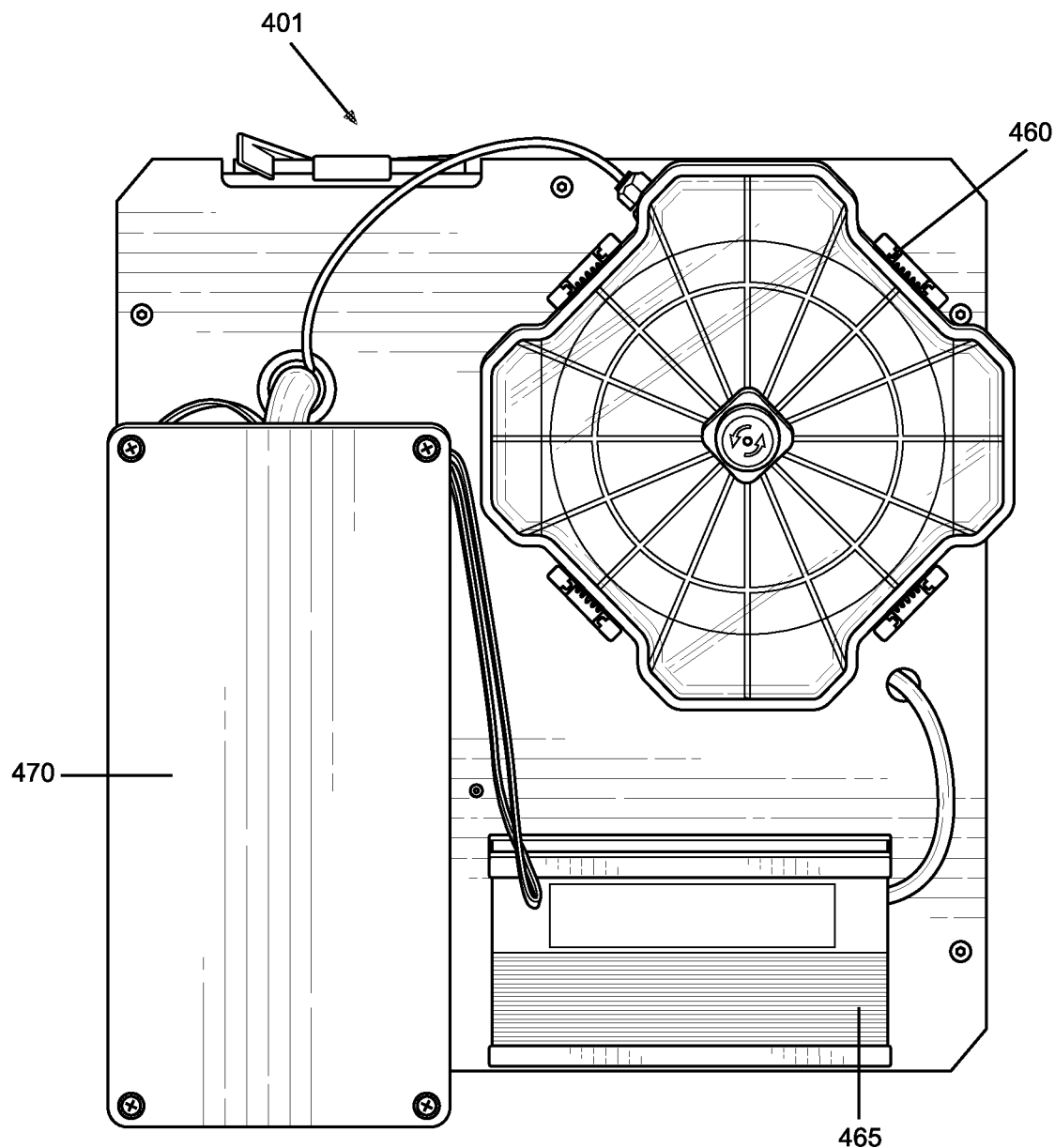
FIG. 29 shows a rear view of the 3D printing system of FIG. 24 without its outside wall.

FIG. 29 shows a rear view of 3D printing system 401 without outside enclosure 403. A removable filament chamber 460 is mounted that integrates a silica desiccant (e.g., silica or activated alumina) to keep print chamber 415 dry in case hygroscopic materials are used. A sealed power supply 465 preferably has a United States Military Standard (MIL-STD) rating. A removable modular electronics unit 470 contains a processor (not shown), a thermostat (not shown) and two separate control boards (not shown) that work in tandem. The thermostat automatically turns on the print chamber heaters on startup and pre-heats the system to acceptable operating conditions before activating the rest of the electronics systems. Additionally, the thermostat postpones power to the control boards should operating temperatures within the electronics enclosure be under 0° F. The first control board is the main control board and manages overall printer operation, the stepper drives, the thermals, and the Solid-State Relays (SSRs) that control the flow of AC power to the heaters. The second control board is designed to manage the onboard machine learning and operate peripherals communication. Tablet computer 451 provides all communication with the second control board which in turns provides communication to the first control board.

FIGS. 1, 19, 20, 23, and 24, while demonstrating different embodiments, would implement independent part-processing solutions used to edit the 3D printed parts during and after the print process. This editing tool should be integrated directly into the existing gantry, or have an independent movement system, and be capable of moving around the part to edit the 3D geometry of a part in progress or a finished part. This editing tool could take the form of a laser that is used to melt, burn, or ablate material from the part for repairing flaws in the print, or for post-processing the parts to meet specifications. Other tools for this purpose may include a metal or composite tool that is heated and applied to the part for the purpose of melting or burning away material, or a chemical application tool for targeted or general application of solid or liquid chemicals for the purpose of eroding materials (this may include caustic chemicals, water, or any other various chemical for the sole purpose of targeted removal of material).

Figure 30:
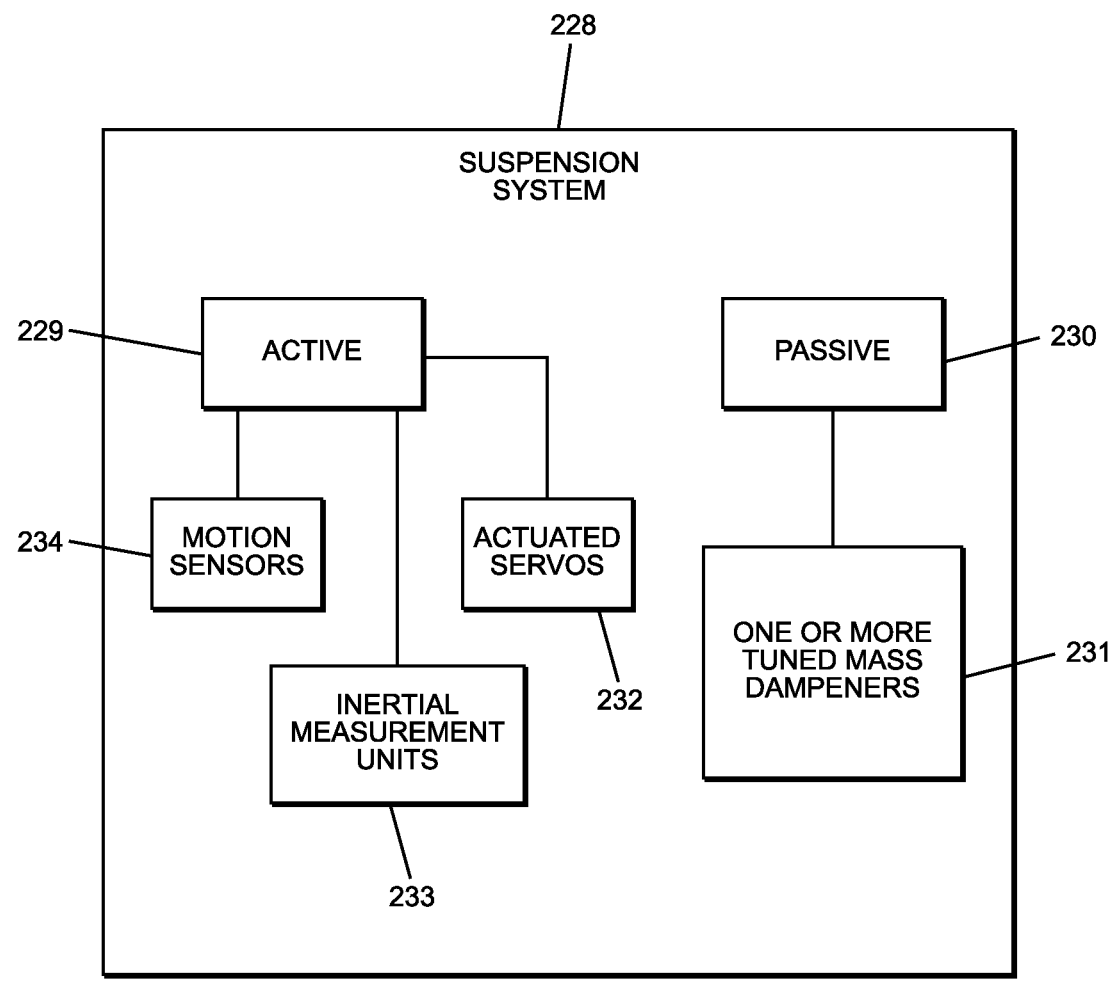
FIG. 30 is a schematic view of a suspension system of a 3D printing system in accordance with the present invention.

FIG. 30 gives an overview of a suspension system 228 employed by a 3D printing system of the present invention. Suspension system 228 includes active and passive suspension systems 229 and 230, respectively, that provide shock absorption, serve to ruggedize the externals and internals of the 3D printer and allow for printing during movement. Much of the disturbances faced by 3D printers during deployment can be mitigated with dampening and vibration compensation. Preferably, passive suspension system 230 includes one or more tuned mass dampeners 231, specifically tuned to the most common mode of noise and vibrations the 3D printing system is expected to experience. Also, preferably, one or more tuned mass dampeners 231 are made of a rubberized mechanical device or fluid. Active suspension system 229 preferably includes actuated servos 232, inertial measurement units 233, and other motion sensors 234 tasked with actively responding to extraneous vibrations and disturbances that passive suspension system 230 is not tuned for. Together, active suspension system 229 and passive suspension system 230 ensure that the printer is capable of surviving falls and handling disturbances during printing operations.

Figure 31:
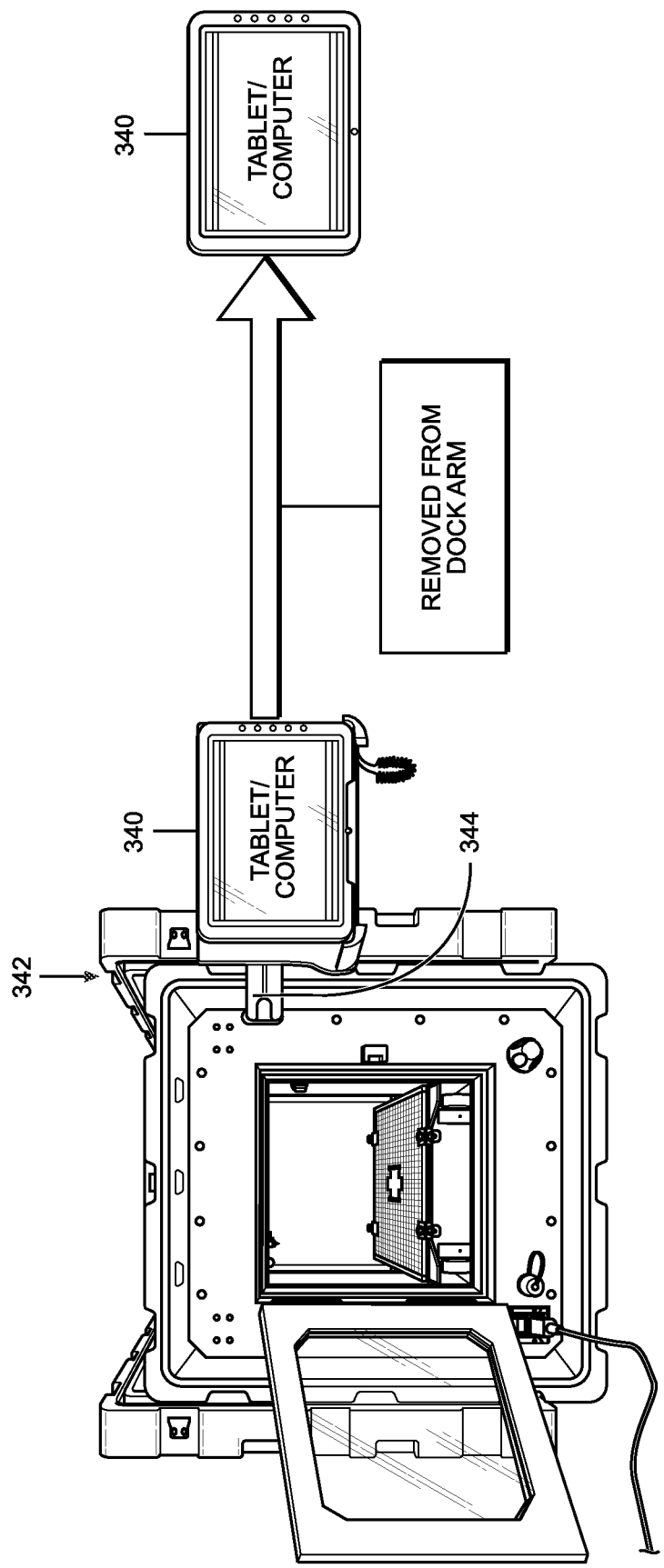
FIG. 31 is a schematic of a tablet/computer attached to or detached from a 3D printer of the present invention.

FIG. 31 shows a tablet or other computing device 340 integrated with a printer housing 342 such to provide an easy-to-use touch screen to operate the printer. In one embodiment, tablet 340 is mounted with a dock arm 344 directly linked to printer housing 342. However, tablet 340 may be mounted to printer housing 342 by other means. In some instances, tablet 340 contains some of the processing resources required or leveraged for enhanced ML and AI optimization of the system and user application of the printer such that the printer would not be able to operate without it or would operate in a diminished capacity. In addition to controlling the printer, tablet 340 may be multifunctional in that it may also communicate with one or more secure or unsecure networks, databases or data vaults to download and upload part files and may be used for parts design with various computer-aided design (CAD) programs Tablet 340 may also provide authentication for operator usage and the capability to lock and unlock usage of the printer based on user permissions. FIG. 31 further shows the ability to remove tablet 340 from printer housing 342 (e.g., from dock arm 344) to operate as an independent platform for design and communication of part files, scans, and various other tasks pertaining to the overall deployment of the printer in an austere, unsupported space.

Figure 32:
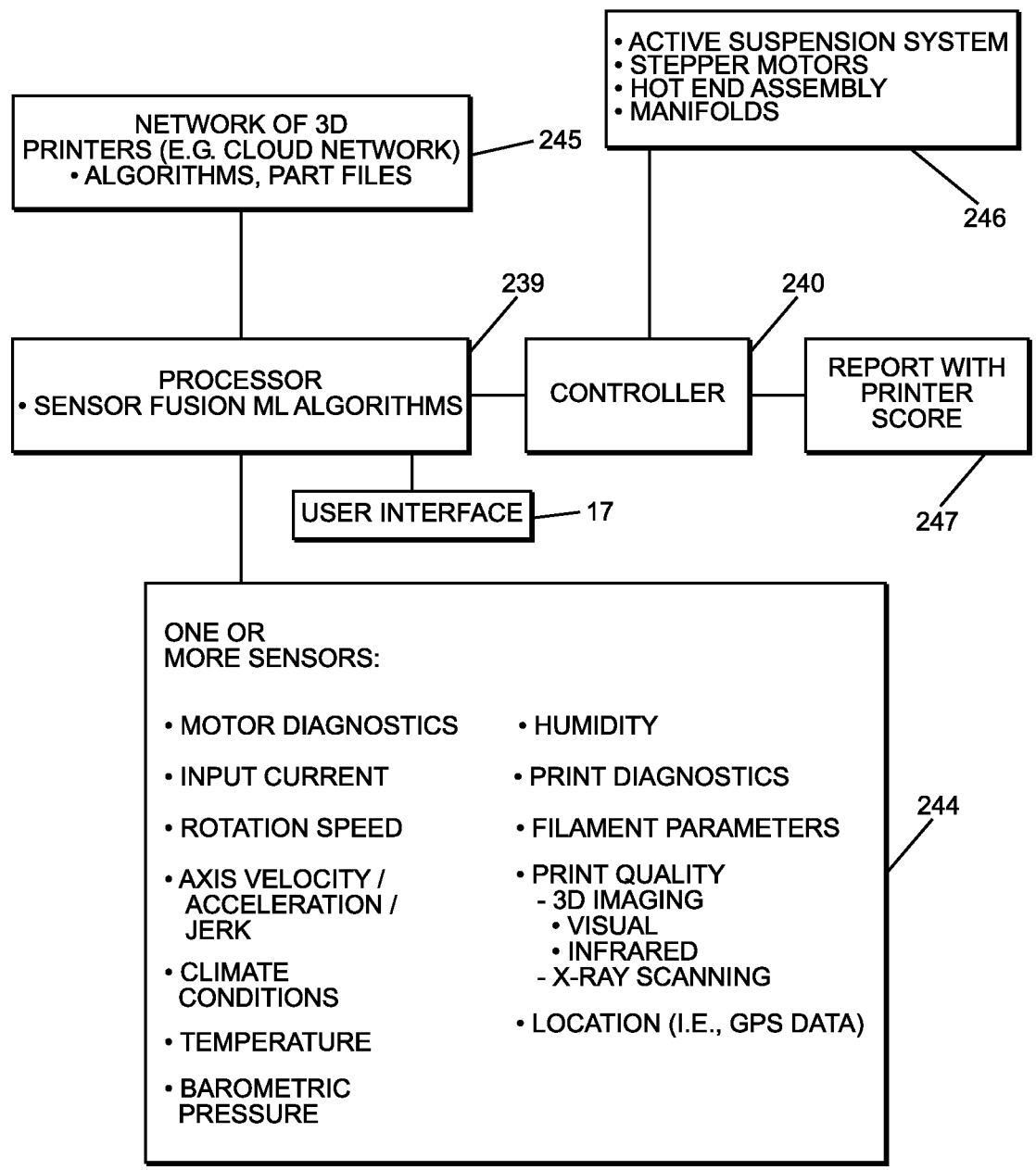
FIG. 32 is a schematic view of the control of a 3D printing system in accordance with the present invention.

FIG. 32 gives an overview of the sensor fusion suite leveraged alongside the ML system. The one or more sensors 244 include internal and/or external sensors that monitor various aspects of 3D printing system 1, its environment, and/or the object being printed, in real-time, including: motor diagnostics; input current; rotation speed; axis velocity/acceleration/jerk; climate conditions; temperature; barometric pressure; humidity; print diagnostics; filament parameters; print quality (e.g., 3D visual or infrared imaging); and location (i.e., GPS data). Part of the implementation of sensor 244 includes integration of inertial measurement units (IMUs) and/or accelerometers placed on the inside of the external shell of the case, as well as another set placed on or outside the shell surrounding the 3D printer, and another on the extruder head/gantry of the 3D printer itself will provide important benefits. Sensors 244 are crucial to ensuring that 3D printing system 1 can withstand harsh climates and react to disturbances and shocks during printing. Sensors 244 are also essential to ensuring the printed object is of good quality and is printed accurately. The output of sensors 244 is directed to processor 239 which employs one or more sensor fusion machine learning (ML) algorithms and which in turn provides input to controller 240. Controller 240 then directs various elements 246 of 3D printing system 1. For example, controller 240 can drive active suspension system 229, stepper motors 112, 113, 184 and 185, hot end assembly 172 and manifolds 45 and 46. This list is not exclusive in that controller 240 is not limited to controlling only those aspects of 3D printing system. Also, sensors 244, particularly a 3D imaging device, would be used for detecting part position within the chamber to calibrate extruder head position relative to the position of the part and current print layer either during the print process, or after restarting after a pause, abort, loss of power, or any other discontinuity in 3D print process. The sensor data can also be stored and made available for post-hoc activities such as analysis for quality control or systems improvements, troubleshooting and for training intelligent software such as machine learning and artificial intelligence.

Climate and Atmospheric Control 3D printing of higher-grade materials is a very sensitive process. Composite materials and metals require high print temperatures and are extremely sensitive to fluctuations in humidity, pressure, and atmospheric temperature. Climate and atmospheric control are required to ensure parts have good structural integrity. The 3D printing system of the present invention can react to changes in the climate during prints and perform the required print adjustments to ensure strong print quality. In one embodiment, in reaction to sensor data from one or more sensors 244, processor 239 implements smart software such as ML algorithms to optimize the internal atmosphere (temperature, humidity, etc.) of 3D printing system 1. The implemented reaction is computed from available simulations of the climate's effect on the print and is fed into controller 240 for facilitation.

Active Print Monitoring

A challenge of adopting 3D printing technologies for the replacement and repair of traditionally manufactured parts is that 3D printed parts often manifest vastly different material properties from the parts to be replaced and are likely to diverge from the tolerance limits of their traditionally minded designs. The 3D printing system of the present invention, in order to more closely conform with the intended specifications of the design, preferably employs a variant of the bi-directional evolutionary structural optimization (BESO) algorithm to optimize a given part's infill topology for various mechanical characteristics under a fixed infill density constraint. The particular algorithmic variant will account for the an-isotropic behavior of FDM parts given their print parameter context and print orientation. In one embodiment, sensors 244 include a 3D imaging device, filament sensors and thermal sensors that actively monitor the progress and quality of the 3D object being printed and check for signs of poor print quality. Controller 240 can adjust print settings automatically to react to dropping quality or failing prints. In another embodiment, sensors 244 include motor diagnostics sensors allow for real-time reconstruction of the expected and actual prints. This creates an error term that can be minimized using intelligent software such as ML sensor fusion algorithms to ensure accurate and high-quality prints. The 3D imaging device can also be used to verify specifications (e.g., measurement tolerances) and to test for inclusions and defects in the printed object. Integrated x-ray scanning can additionally or alternatively used to validate the quality of printed object and test for defects.

Figure 33:
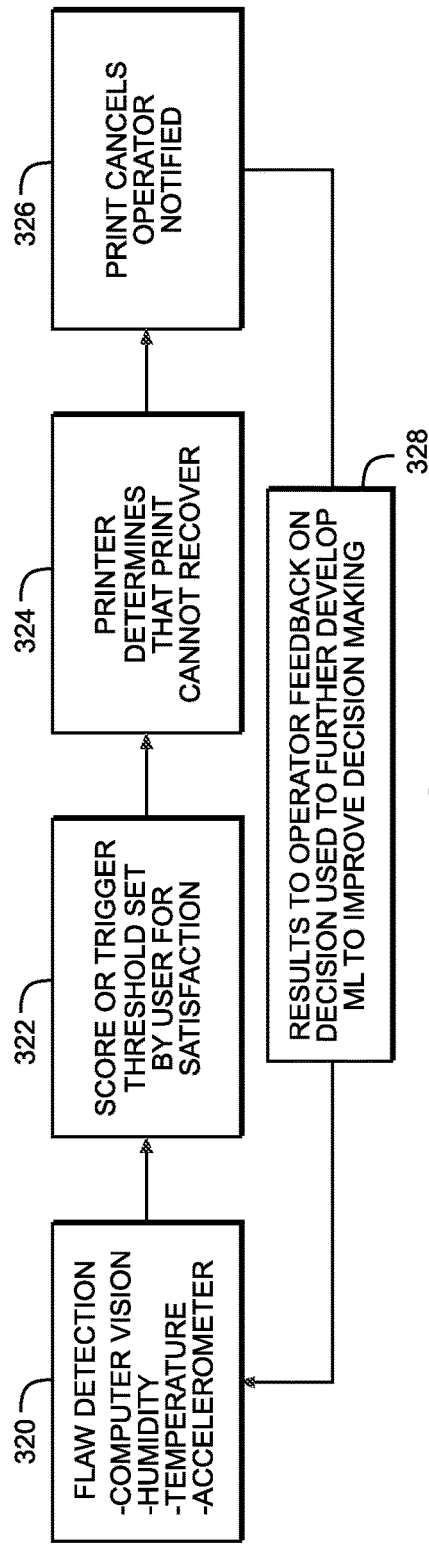
FIG. 33 is a block diagram representing intelligent software to detect flaws and to alert users about flaws.

FIG. 33 outlines flaw detection capabilities of the 3D printing system enhanced with intelligent software including but not limited to artificial intelligence or machine learning leading to the live detection of print quality and scoring of print quality. In step 320, a flaw is detected based on data obtained from, e.g., computer vision, a humidity sensor, a temperature sensor or an accelerometer. In response to the flaw detection, in step 322 a minimum print quality score or trigger threshold set by the operator or described in the part file technical data sheet (as described in FIG. 34) is consulted. In step 324, the software (ML, AI, models) determines that the print will not meet the minimum quality threshold. In step 326, the print will be automatically canceled, or the operator will be notified to make the decision whether to cancel or continue. In step 328, feedback loops (decision results sent to operator) allow the system (e.g., ML) to learn and improve decision making. Alerts to the operator could be any one or a combination of electronic alerts such as email or text messages, audible alerts such as an alarm or voice message, or visual alerts such as flashing lights or a text notification screen attached to or associated with the printer.

Sensor Fusion ML Algorithms

In accordance with the one or more sensor fusion ML algorithms used by process 239, ML is implemented to modify operating internal print parameters via sensor fusion (i.e., the combination of data collected from one or more sensors 244). ML may include one or more of: a Gaussian process regression algorithm, a Kalman or Particle filter, a deep convolutional neural network algorithm, a deep recurrent neural network, a random forest model, gradient boosting algorithms, Joint Probabilistic Data Association Filters, a hidden Markov model, meta reinforcement learning model, keypoint detection, canonical correlation analysis, factor graph models, Markov random field models, or any combination thereof. Preferably, the one or more sensor fusion ML algorithms are developed and updated in network 245 (e.g., a cloud network), where 3D printers operate as data collection nodes for a central ML algorithm. Data on all the printers in network 245 is transmitted to a central command or company during maintenance and updated with collective intelligence. Major updates to control algorithms are done by connecting to network 245 for updates while maintaining onboard ML capabilities.

Part Scanning

Network 245 can also host a repository of 3D part files from various providers and sensors 244 can include a 3D imaging device having software to scan (e.g., using visual and infrared spectra) and recognize broken parts and to match the broken parts to similar parts within the repository. Because it is simple for users to locate broken or failed parts in the part repository, the 3D printing system of the present invention can deal quickly with part failures in the supply chain. The repository can be organized to facilitate part lookup via NIIN (National Item Identification Number) or other identification (ID) number, assembly or subassembly components, vendor or manufacturer information, or from 3D scan to CAD matching. Preferably, network 245 is paired with information from common military manufacturers (e.g., identification numbers such) to enable easy part lookup and the part files are provided via CAD files. To ensure confidentiality and protection of national security, these part files can be provided via secure methods. When the 3D printing system is deployed in locations with low bandwidth connections, the transfer of large file sizes is facilitated by a compression algorithm which can reduce 3D file types (e.g., STEP or STL) by approximately 10 times.

Print Report

In an embodiment, processor 239 tracks the data collected by one or more sensors 244 and all adjustments made during a print cycle and controller 240 creates a report 247 for the user. Report 247 shows any potential issues and time-stamped "events" (e.g., a shock to the system or sudden changes in temperature or humidity). Preferably, report 247 includes a score reflecting how "successful" the print was (e.g., based on the number of adjustments needed, any detectable deviations from a render or theoretical model, etc.) This score is given to the user to help facilitate use decisions and is also saved to be used to optimize ML algorithms.

Figure 34:
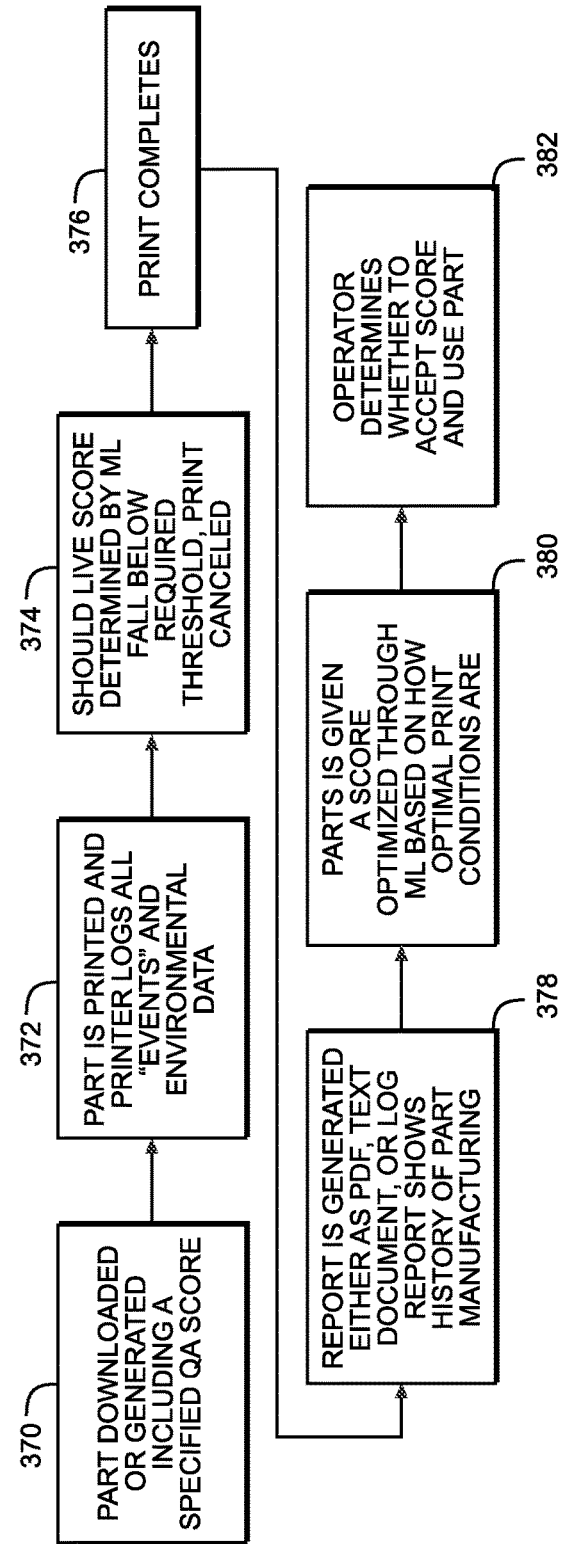
FIG. 34 is a block diagram for an approach to analyze, learn and improve quality as well as provide a scorecard-based quality report.

In another embodiment, shown in FIG. 34, a part is downloaded or generated and includes a specified quality assurance (QA) score in step 370. In step 372, the part is printed and the printer logs all "events" and environmental data. Should a live score determined by ML fall below the required threshold, the print is cancelled in step 374. Otherwise, the print completes in step 376 and in step 378 a report is generated as a PDF document, a text document or a log report showing history of the part manufacturing. In step 380, the print is given a score optimized through ML based on how optimal the print conditions were. Lastly, at step 382 the operator determines whether to accept the print score and use the printed part.

The print report (that is also stored for improving ML models of the printer and supporting software and providing data for analysis by the customer for optimizing their supply chain, part files, and deployment) could contain a scoring system that could be represented by a score between 0-100. The staged threshold of acceptance would vary from part to part and be assigned by an engineer in the technical data package for the part. For example, if the part were considered high risk, it would mandate a print score of above 95; however, if the part is a draft and does not require precision, it may be set a required print score of 50. The print score would be determined by an automated process that would leverage the sensor fusion suite to provide a score.

Figure 35:
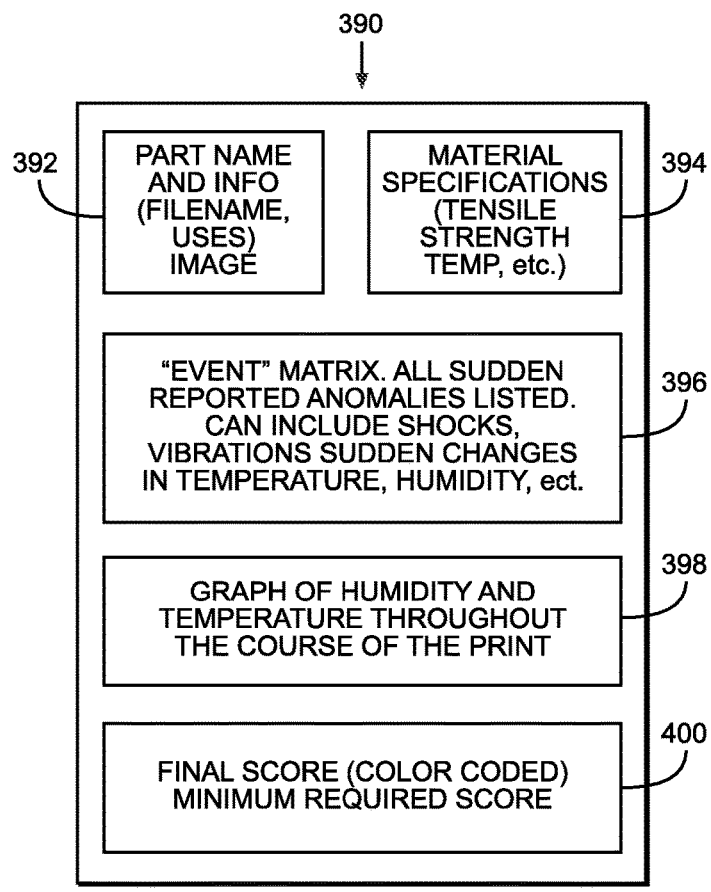
FIG. 35 is an example of a scorecard-based quality report.

FIG. 35 shows an exemplary scorecard-based report 390. In addition to providing the part name and info 392 (e.g., file name, image) and material specifications 394 (e.g., tensile strength), report 390 displays a matrix 396 of logged events like shocks, vibrations, or spikes in and of the recorded conditions. A graph 398 shows logged variations in e.g., humidity and temperature. A final score 400 is displayed and color coded to categories of usage (e.g., green for completely passing specifications, yellow for close to threshold and should be determined by operator, red for does not meet specifications laid out in the technical data package). Report 90 is preferably formatted as an infographic or dashboard display.

Pricing and Payment

Figure 36:
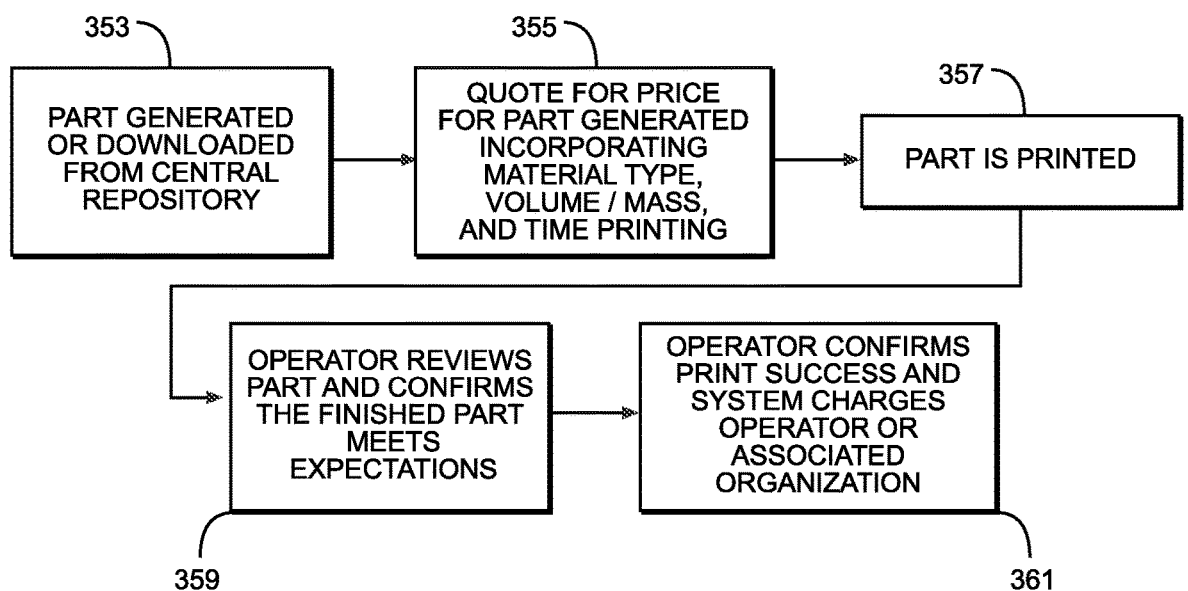
FIG. 36 is a block diagram of a pay by print system that is integrated with quality control.

FIG. 36 gives an overview of how the 3D printing system can facilitate the production of parts using an integrated payment and quality assurance system. In step 353, a digital rendering of a part is generated or is downloaded from a central repository. In step 355, a quote for the price of the part is generated by considering one or more of: the type of material; the volume/mass of material; the time to print; and the actual or estimated retail or wholesale price of an equivalent commercially available part (and could include a premium or discount based on value-add). Price inputs could be automatically updated based on market changes. The part is printed at step 357 and at step 359 the operator reviews the printed part and confirms the printed part meets expectations (e.g., printed to specification). Before the part is printed, there may be a step of verifying that the part file selected for print is the correct part. Following the operator confirming print success, the 3D printing system at step 361 charges the operator or associated organizing and the payment is processed.

Based on the above, it should be readily apparent that the invention provides for a rugged, portable and fully contained 3D printing system suitable for deployment in extreme and remote environments, such as for combat or disaster relief situations. The mounting, suspension and sensor-based configuration establishes a robust and reliable printing system. In any case, although described with reference to exemplary embodiments of the invention, it should still be understood that modifications can be made to the invention as disclosed without departing from the spirit of the invention.

What is claimed is:

1. A ruggedized 3D printing system comprising:
   an outer enclosure including a water and impact resistant body;
   a print chamber within the outer enclosure and including a vertically adjustable internal print bed;
   a passive suspension system located between the print chamber and the outer enclosure;
   one or more internal and/or external sensors configured to monitor, in real time, various operational parameters of the printing system, its environment, and/or objects being printed, wherein the one or more internal and/or external sensors includes a shock wave detector;
   a modular electronics unit including a processor configured to adjust print operating parameters of the printing system based on data received from the one or more internal and/or external sensors, including pausing a print operation when the shock wave detector detects shock waves above a threshold, wherein the processor is configured to generate a print quality report including a generated score based on sensor fusion of data received from the one or more internal and/or external sensors; and
   an automated or semi-automated pay-by-print system integrated with a quality assurance system based on the generated score.

2. The ruggedized 3D printing system of claim 1, wherein the processor is configured to operate through sensor fusion machine learning algorithms.

3. The ruggedized 3D printing system of claim 1, wherein the passive suspension system includes one or more tuned mass dampeners.

4. The ruggedized 3D printing system of claim 3, further comprising an active suspension system configured to provide adjustable suspension support for the print chamber.

5. The ruggedized 3D printing system of claim 1, further comprising a printer enclosure within the outer enclosure, wherein the print chamber is located within the printer enclosure.

6. The ruggedized 3D printing system of claim 5, wherein the modular electronics unit is mounted between the printer enclosure and the outer enclosure.

7. The ruggedized 3D printing system of claim 5, wherein the print chamber further includes a top having bellows configured to provide thermal insulation to the print chamber and reduce airflow in and out of the print chamber.

8. The ruggedized 3D printing system of claim 5, wherein the internal print bed is supported and guided for vertical movement by a plurality of rods located outside the print chamber.

9. A method of printing a 3D object using a ruggedized 3D printing system comprising an outer enclosure including a water and impact resistant body; a print chamber within the outer enclosure and including a vertically adjustable internal print bed; a passive suspension system located between the print chamber and the outer enclosure; one or more internal and/or external sensors configured to monitor, in real time, various operational parameters of the printing system, its environment, and/or objects being printed, wherein the one or more internal and/or external sensors includes a shock wave detector; and
    a modular electronics unit including a processor configured to adjust print operating parameters of the printing system based on data received from the one or more internal and/or external sensors, including pausing a print operation when the shock wave detector detects shock waves above a threshold, the method comprising:
adjusting the vertical position of the internal print bed;
mitigating external shocks or vibrations with the passive suspension system;
using the one or more internal and/or external sensors to monitor, in real time, various operational parameters of the printing system, its environment, and/or objects being printed;
adjusting print operating parameters of the printing system based on data received from the one or more internal and/or external sensors, including pausing the print operation when the shock wave detector detects shock waves above the threshold;
generating a print quality report including a generated score based on sensor fusion of data received from the one or more internal and/or external sensors; and
using an automated or semi-automated pay-by-print system integrated with a quality assurance system based on the generated score.

10. The method of claim 9, further comprising operating the processor through sensor fusion machine learning algorithms.

11. The method of claim 9, wherein mitigating external shocks or vibrations with the passive suspension system includes mitigating external shock or vibrations with one or more tuned mass dampeners.

12. The method of claim 11, further comprising using an active suspension system to provide adjustable suspension support for the print chamber.

13. The method of claim 9, wherein adjusting the vertical position of the internal print bed includes adjusting the vertical position of the internal print bed within a printer enclosure located within the outer enclosure and within which the print chamber is located.

14. The method of claim 13, wherein the modular electronics unit is mounted between the printer enclosure and the outer enclosure.

15. The method of claim 13, further comprising providing thermal insulation to the print chamber and reducing airflow in and out of the print chamber using a bellows at a top of the print chamber.

16. The method of claim 13, further comprising supporting and guiding the internal print bed for vertical movement using a plurality of rods located outside the print chamber.

* * * * *